US009910821B2

(12) United States Patent
Mizobuchi

(10) Patent No.: US 9,910,821 B2
(45) Date of Patent: Mar. 6, 2018

(54) DATA PROCESSING METHOD, DISTRIBUTED PROCESSING SYSTEM, AND PROGRAM

(71) Applicant: FUJITSU LIMITED, Kawasaki-shi, Kanagawa (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 661 days.

(21) Appl. No.: 14/243,327

(22) Filed: Apr. 2, 2014

(65) Prior Publication Data

US 2014/0215003 A1    Jul. 31, 2014

Related U.S. Application Data

(63) Continuation of application No. PCT/JP2011/073099, filed on Oct. 6, 2011.

(51) Int. Cl.
*G06F 15/173* (2006.01)
*G06F 9/50* (2006.01)

(52) U.S. Cl.
CPC ...... *G06F 15/17331* (2013.01); *G06F 9/5066* (2013.01)

(58) Field of Classification Search
CPC ......... G06F 17/30451; G06F 17/30545; G06F 9/5066; G06F 15/17331; G06F 12/0842;
(Continued)

(56) References Cited

U.S. PATENT DOCUMENTS 6,973,650 B1 *  12/2005  Parkes ................. G06F 9/4843
711/118

7,065,097 B2 *  6/2006  Kumazaki ................ H04N 7/52
370/428
(Continued)

FOREIGN PATENT DOCUMENTS

JP    9-231184    9/1997
JP    10-97544    4/1998
(Continued)

OTHER PUBLICATIONS

Chen et al,. "Tiled-MapReduce: Optimizing Resource Usages of Data parallel Applications on Multicore with Tiling", Sep. 11-15, 2010, PACT'10, 12 pages total.*
Ji et al., Using Shared Memory to Accelerate MapReduce on Graphics Processing Units, May 2011, Proceedings of the 2011 IEEE International Parallel & Distributed Processing Symposium.*
Hiroshi, "Caching Mechansim Based on Udpate Frequency", Apr. 2010, (11 pages total).*
(Continued)

*Primary Examiner* — Vivek Srivastava
*Assistant Examiner* — Todd L Barker
(74) *Attorney, Agent, or Firm* — Staas & Halsey LLP

(57) ABSTRACT

A storage device stores results of first data processing previously performed. A splitting unit splits, with reference to the storage device, data into a first segment for which the results stored in the storage device are usable and a plurality of second segments for which the results stored in the storage device are not usable. A control unit assigns the plurality of second segments to a plurality of nodes, and uses the plurality of nodes in parallel to perform the first data processing on the plurality of second segments. A control unit exercises control so as to perform second data processing on a previous result corresponding to the first segment, which is stored in the storage device, and results obtained from the plurality of second segments using the plurality of nodes.

5 Claims, 27 Drawing Sheets

(58) Field of Classification Search
CPC .... G06F 12/084; G06F 12/0868; G06F 15/16; G06F 9/4812; G06F 9/4843; G06F 9/5005; G06F 9/52; G06F 8/71; G06F 17/30; G06F 17/30194; G06F 17/3023; G06F 17/40; G06F 15/1733; G06Q 10/107; G06Q 30/0621
See application file for complete search history.

(56) References Cited

U.S. PATENT DOCUMENTS

| | | | | |
|---|---|---|---|---|
| 7,181,417 | B1* | 2/2007 | Langseth | G06Q 30/0621 705/26.5 |
| 2003/0187628 | A1 | 10/2003 | Nagase | |
| 2005/0246323 | A1* | 11/2005 | Becher | G06F 17/30575 |
| 2006/0200637 | A1* | 9/2006 | Galipeau | G06F 11/2097 711/162 |
| 2007/0106844 | A1* | 5/2007 | Ohkawa | G06F 15/16 711/130 |
| 2007/0106849 | A1* | 5/2007 | Moore | G06F 17/30132 711/137 |
| 2007/0220026 | A1* | 9/2007 | Isard | G06F 12/0802 |
| 2007/0271565 | A1* | 11/2007 | Tirumalai | G06F 9/4843 718/100 |
| 2008/0120314 | A1 | 5/2008 | Yang et al. | |
| 2011/0072006 | A1* | 3/2011 | Yu | G06F 17/30451 707/718 |
| 2011/0154339 | A1 | 6/2011 | Lee et al. | |
| 2011/0191333 | A1* | 8/2011 | Gutlapalli | G06F 3/048 707/725 |
| 2012/0197596 | A1* | 8/2012 | Comi | G06F 9/5066 702/188 |

FOREIGN PATENT DOCUMENTS

| | | | | |
|---|---|---|---|---|
| JP | 2003-296395 | | 10/2003 | |
| JP | 2010-92222 | | 4/2010 | |
| JP | 2010092222 | * | 4/2010 | ............ G06F 15/16 |
| JP | 2010092222 A | * | 4/2010 | |
| JP | 2010-244470 | | 10/2010 | |
| WO | WO 2011/134875 | * | 11/2011 | ............ G06F 9/48 |

OTHER PUBLICATIONS

Popa, "DryadInc: Resuing work in large-scale computations", Jun. 2009, HotCloud 2009, Workshop on Hot Topiics in Cloud Computing, USENIX.*
Vecchiola, "High Performance Cloud Computing: A View of Scientifc Applications", 2009 10th Interrnational Symposium on Pervasive Systems, Algorithms, and Networks.*
Popa, "DryadINc:Reusing work in large scale computations", Jun. 2009, HotCloud 2009, Workshop on Hot Topics in Cloud Computing, USENIX.*
Japanese Office Action dated May 12, 2015 in corresponding Japanese Patent Application No. 2013-537333.
U. Banerjee et al., "Automatic Program Parallelization," *Proceedings of the IEEE* (*Institute of Electrical and Electronics Engineers*), vol. 81, No. 2, Feb. 1993, pp. 211-243.
D. Culler et al., *Parallel Computer Architecture: A Hardware/Software Approach* ([*DRAFT: Parallel Computer Architecture,*) The Morgan Kaufmann Series in Computer Architecture and Design, Aug. 1997, pp. 1-880 (877 pages).
Patent Abstracts of Japan, Publication No. 09-231184, Published Sep. 5, 1997.
Patent Abstracts of Japan, Publication No. 10-097544, Published Apr. 14, 1998.
Patent Abstracts of Japan, Publication No. 2003-296395, Published Oct. 17, 2003.
J. Dean et al., "MapReduce: Simplified Data Processing on Large Clusters," *Proceedings of the 6th Symposium on Operation Systems Design and Implementation*, Google Research Publications, Dec. 2004, pp. 137-149 and Cover Sheet with Abstract.
Patent Abstracts of Japan, Publication No. 2010-92222, Published Apr. 22, 2010.
Patent Abstracts of Japan, Publication No. 2010-244470, Published Oct. 28, 2010.
International Search Report dated Nov. 8, 2011 in corresponding International Patent Application No. PCT/JP2011/073099.
Parvizi, "Inkrementelle Neuberechnungen mit MapReduce", Bachelor Thesis, Technische Universitat Kaiserslautern, Jun. 27, 2011,pp. i-iv, 1-44.
Extended European Search Report dated Jun. 7, 2016 in corresponding European Patent Application No. 11873769.1.

* cited by examiner

611

| RATING VALUE TABLE |||||||
|---|---|---|---|---|---|
| DATE | PRODUCT ID | RATING VALUE ||||
| | | Taro | Jiro | Kenji | Satoshi |
| 2011/3/1 | Item1 | 1 | — | — | — |
| 2011/3/1 | Item2 | — | 2 | — | — |
| 2011/3/1 | Item3 | — | — | 3 | — |
| 2011/3/1 | Item4 | — | — | — | 5 |
| 2011/3/2 | Item1 | — | 4 | — | — |
| 2011/3/2 | Item2 | — | — | 4 | — |
| 2011/3/3 | Item1 | — | — | 2 | — |
| 2011/3/3 | Item2 | — | — | — | 4 |
| 2011/3/4 | Item1 | — | — | — | 2 |
| 2011/3/4 | Item5 | 4 | — | — | — |
| 2011/3/4 | Item6 | — | 2 | 5 | — |
| 2011/3/5 | Item2 | 5 | — | — | — |
| 2011/3/5 | Item4 | 2 | 5 | — | — |
| 2011/3/5 | Item5 | — | 1 | — | 1 |

FIG. 6

| INTERMEDIATE DATA TABLE | | | 711 |
| --- | --- | --- |
| INPUT DATA HASH VALUE | DATA DATE | INTERMEDIATE DATA |
| 123a5c | 2011/03/01-05 | RESULT 01-05 |
| b21982 | 2011/03/02-05 | RESULT 02-05 |
| fad9e2 | 2011/03/06 | RESULT 06 |
| 511bbc | 2011/03/03-05 | RESULT 03-05 |
| 713da9 | 2011/03/07 | RESULT 07 |

FIG. 7

```
public static class CollaborativeFiltering_phase1_Map implements Mapper<LongWritable, Text, Text, ArrayWritable>  ← 911
{ protected void map(LongWritable key, Text value, Context context) throws IOException, InterruptedException {
    //ONE LINE OF PURCHASE HISTORY EXISTS IN value
    String line = value.toString();
    //STRINGS ARE DELIMITED BY "," (COMMA) AND USED AS TOKENS
    StringTokenizer tokenizer = new StringTokenizer(line, ",");
    //FIRST TOKEN IS USER NAME OF USER WHO ENTERED RATING VALUE
    String name = tokenizer.nextToken();
    //SECOND TOKEN IS PRODUCT ID OF RATED PRODUCT
    String item = tokenizer.nextToken();
    //THIRD TOKEN IS RATING DATE
    String date = tokenizer.nextToken();
    //FOURTH TOKEN IS RATING VALUE
    String rate = tokenizer.nextToken();
    //REGISTER PRODUCT ID AS KEY AND STRING MADE UP OF USER NAME, RATING DATE, AND RATING VALUE CONNECTED WITH HYPHENS ("-") AS VALUE.
    context.write(new Text(item), new Text(name+"-"+date+"-"+rate));
  }
}
```

FIG. 9

```
public class CollaborativeFiltering_phase1_Reduce implements
Reducer<Text, ArrayWritable, Text, MapWritable> {
    //FUNCTION OF RECEIVING KEY-VALUE PAIRS GENERATED IN map AND
PERFORMING Reduce OPERATION
    protected void reduce(Text key, Iterable<Text> values, Context
context) throws IOException, InterruptedException {
        String value_rateList = "";
        Map<String, ArrayList> map = new HashMap<String, ArrayList>();
        Map<String, String> map_value = new HashMap<String, String>();

for (Text value : values) {
            StringTokenizer tokenizer = new StringTokenizer(value.toString(),
"-");
            //NAME OF PERSON WHO RATED
            String name = tokenizer.nextToken();
            //DATE
            String date = tokenizer.nextToken();
            //RATING VALUE
            String rate = tokenizer.nextToken();

//CREATION OF Date OBJECT
            String[] s = date.split("/");
            Date d = new Date(Integer.valueOf(s[0]).intValue(),
Integer.valueOf(s[1]).intValue(),   Integer.valueOf(s[2]).intValue());

ArrayList list = map.get(name);
            Date d2 = (Date)list.get(0);
            //SELECT LATEST RATING DATE
            if(d.after(d2)) {
                list.clear();
                list.add(d2);
                list.add(rate);
                map.put(name, list);
            }
        }

//PUT LATEST RATING VALUE GIVEN BY EACH USER IN value
        Iterator iter = map.keySet().iterator();
        while(iter.hasNext()) {
        String name = (String)iter.next();
        String rate = (String)((ArrayList)map.get(name)).get(1);
        map_value.put(name,rate);
    }
    //REGISTER PRODUCT NAME AS KEY AND MAP OF USER AND RATING VALUE FOR
EACH PRODUCT NAME AS VALUE
    context.write(key, new MapWritable(context.write(key, new
MapWritable(map)));
}
```

FIG. 12

DATA PROCESSING METHOD, DISTRIBUTED PROCESSING SYSTEM, AND PROGRAM

CROSS-REFERENCE TO RELATED APPLICATION

This application is a continuation application of International Application PCT/JP2011/073099 filed on Oct. 6, 2011 which designated the U.S., the entire contents of which are incorporated herein by reference.

FIELD

The embodiments discussed herein relate to a data processing method, a distributed processing system, and a program.

BACKGROUND

Data processing may be performed using a distributed processing system that includes a plurality of nodes (for example, computers or other information processing apparatuses) connected to a network. By splitting and assigning data to a plurality of nodes and using the plurality of nodes in parallel, higher-speed data processing may be achieved. Such parallelization of data processing is employed for processing large amount of data, for example, for analyzing access logs indicating accesses to a server apparatus.

To support creation of a program for parallel data processing, frameworks such as MapReduce or the like have been proposed. A data processing method defined in MapReduce includes a Map phase and a Reduce phase. In the Map phase, input data is split into data blocks, which are then processed using a plurality of nodes. In the Reduce phase, the results obtained in the Map phase are aggregated using one or more nodes according to keys or the like. The results obtained in the Reduce phase may be given to the next Map phase. It is possible to cause the framework to automatically perform the data split and aggregation.

There has been proposed a distributed processing system that confirms a change in the amount of data before and after processing, and sets a higher distribution degree when the amount of data decreases or sets a lower distribution degree when the amount of data increases, to thereby prevent communication between nodes from becoming a bottleneck. In addition, to achieve higher-speed simulation in the electromagnetic analysis simulation for electric circuits, there has been proposed a method in which the analysis results of a main part are stored, and when an additional patch is inserted, electromagnetic analysis is performed only on the additional patch, using the stored analysis results of the main part.

Japanese Laid-open Patent Publication No. 2010-244470
Japanese Laid-open Patent Publication No. 2003-296395
Jeffrey Dean and Sanjay Ghemawat, "MapReduce: Simplified Data Processing on Large Clusters", Proc. of the 6th Symposium on Operating Systems Design and Implementation, pp. 137-150, December 2004

In some distributed processing systems, data is split into blocks which are then processed through first-stage data processing using a plurality of nodes, and then the results of the first-stage data processing are processed through second-stage data processing. However, in the conventional distributed processing systems in which given data is automatically split and processed in parallel, the first-stage data processing may be performed on the entire data each time the data is entered, which means wasting the previous results of the data processing.

SUMMARY

According to one aspect, there is provided a data processing method executed in a system where first data processing is performed using a plurality of nodes in parallel and second data processing is performed on a result of the first data processing. The data processing method includes: splitting, by a processor, data into a first segment and a plurality of second segments with reference to a memory storing results of the first data processing previously performed, the first segment being a segment for which the results stored in the memory are usable, the plurality of second segments being segments for which the results stored in the memory are not usable; assigning, by the processor, the plurality of second segments to the plurality of nodes, and using the plurality of nodes in parallel to perform the first data processing on the plurality of second segments; and performing, by the processor, the second data processing on a previous result corresponding to the first segment, which is stored in the memory, and results obtained from the plurality of second segments using the plurality of nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a rating value table;
FIG. 7 illustrates an example of an intermediate data table;
FIG. 9 illustrates an example of a first Map class;
FIG. 12 illustrates an example of a first Reduce class.

DESCRIPTION OF EMBODIMENTS

Hereinafter, embodiments of the present invention will be described with reference to the accompanying drawings.

First Embodiment

Figure 1:
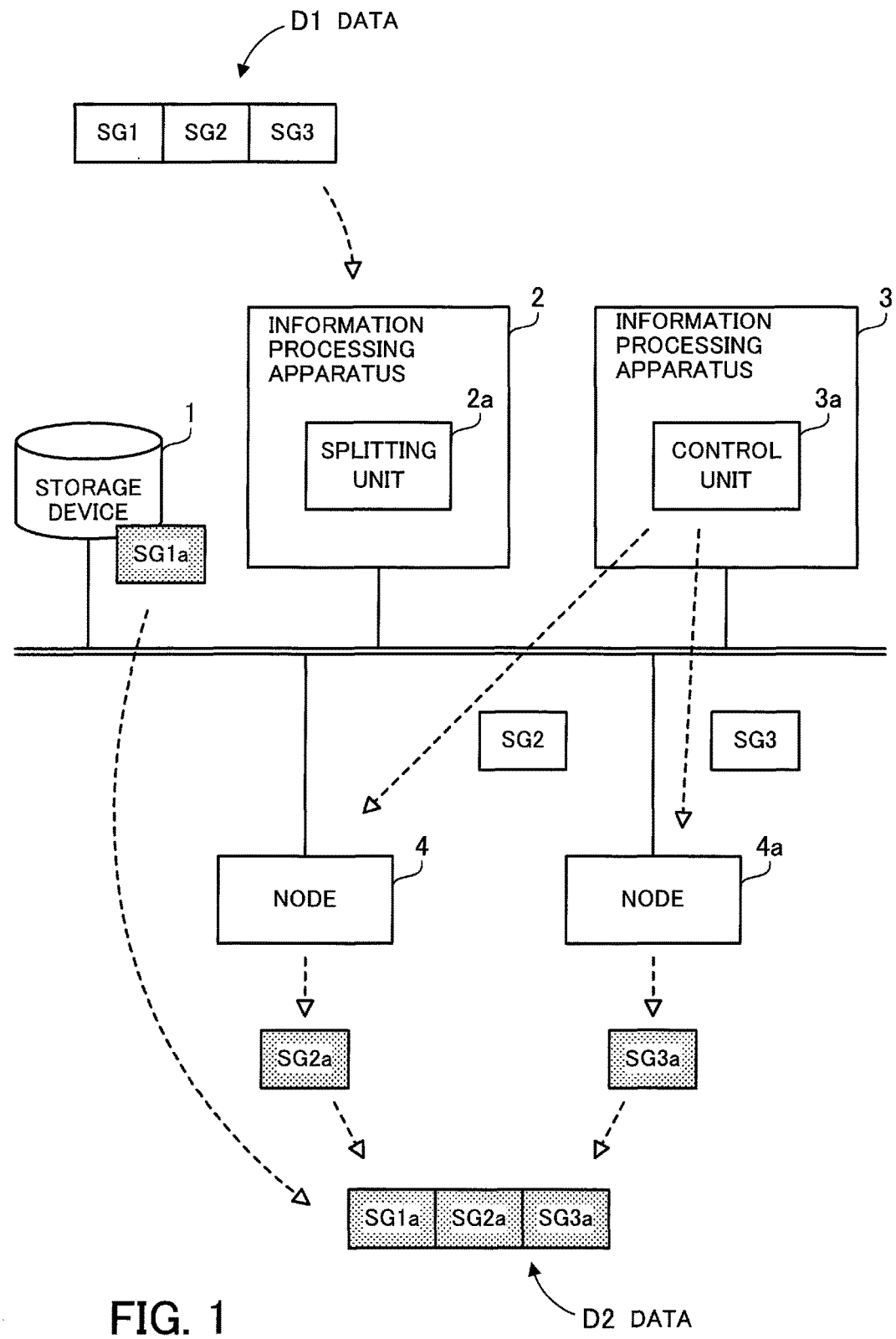
FIG. 1 illustrates a distributed processing system according to a first embodiment.

FIG. 1 illustrates a distributed processing system according to a first embodiment. In the distributed processing system of the first embodiment, first data processing is performed using a plurality of nodes in parallel, and second data processing is performed on the results of the first data processing. For example, in the case of MapReduce, a Map phase is executed as the first data processing, and a Reduce phase is executed as the second data processing. The distributed processing system of the first embodiment includes a storage device 1, information processing apparatuses 2 and 3, and nodes 4 and 4a. The storage device 1, information processing apparatuses 2 and 3, and nodes 4 and 4a are connected over a network. The nodes 4 and 4a are designed to process input data in parallel. Each of the information processing apparatuses 2 and 3 and nodes 4 and 4a may be a computer which is equipped with a processor, such as a CPU (Central Processing Unit) or the like, and a memory, such as a RAM (Random Access Memory) or the like, and in which the processor executes a program stored in the memory.

The storage device 1 is data storage that is accessible over the network. For example, the storage device 1 stores data in an HDD (Hard Disk Drive), an SSD (Solid State Drive), or another device. The storage device 1 stores the results of the first data processing previously performed.

The information processing apparatus 2 includes a splitting unit 2a. The splitting unit 2a splits, with reference to the storage device 1, data D1 into a first segment SG1 for which the results stored in the storage device 1 are usable and second segments SG2 and SG3 for which the results stored in the storage device 1 are not usable.

The information processing apparatus 3 includes a control unit 3a. The control unit 3a assigns the second segments SG2 and SG3 to the nodes 4 and 4a, and uses the nodes 4 and 4a in parallel to perform the first data processing on the second segments SG2 and SG3. The control unit 3a then exercises control so as to perform the second data processing on a previous result SG1a corresponding to the first segment SG1, which is stored in the storage device 1, and the results SG2a and SG3a obtained from the second segments SG2 and SG3 using the nodes 4 and 4a. What is subjected to the second data processing is data D2 that is a result of processing the data D1 in parallel. The data D2 includes the results SG1a, SG2a, and SG3a obtained by processing the segments SG1, SG2, and SG3. The control unit 3a uses, for example, the nodes 4 and 4a in parallel to perform the second data processing on the data D2.

In the distributed processing system of the first embodiment, the splitting unit 2a splits, with reference to the storage device 1, the data D1 into the first segment SG1 for which the results stored in the storage device 1 are usable and the second segments SG2 and SG3 for which the results stored in the storage device 1 are not usable. The control unit 3a assigns the second segments SG2 and SG3 to the nodes 4 and 4a, and uses the nodes 4 and 4a in parallel to perform the first data processing on the second segments SG2 and SG3. The control unit 3a then exercises control so as to perform the second data processing on the previous result SG1a corresponding to the first segment SG1, which is stored in the storage device 1, and the results SG2a and SG3a obtained from the second segments SG2 and SG3 using the nodes 4 and 4a.

The above approach makes it possible to streamline the data processing. More specifically, this approach causes the nodes 4 and 4a to process the segments SG2 and SG3 other than the segment SG1 for which previous processing results are available, in a distributed manner. Therefore, there is no need of processing the entire data D1. Control of skipping the same processing as previously performed improves processing efficiency and achieves higher-speed processing. It is also possible to reduce the workloads of the nodes 4 and 4a.

Second Embodiment

Figure 2:
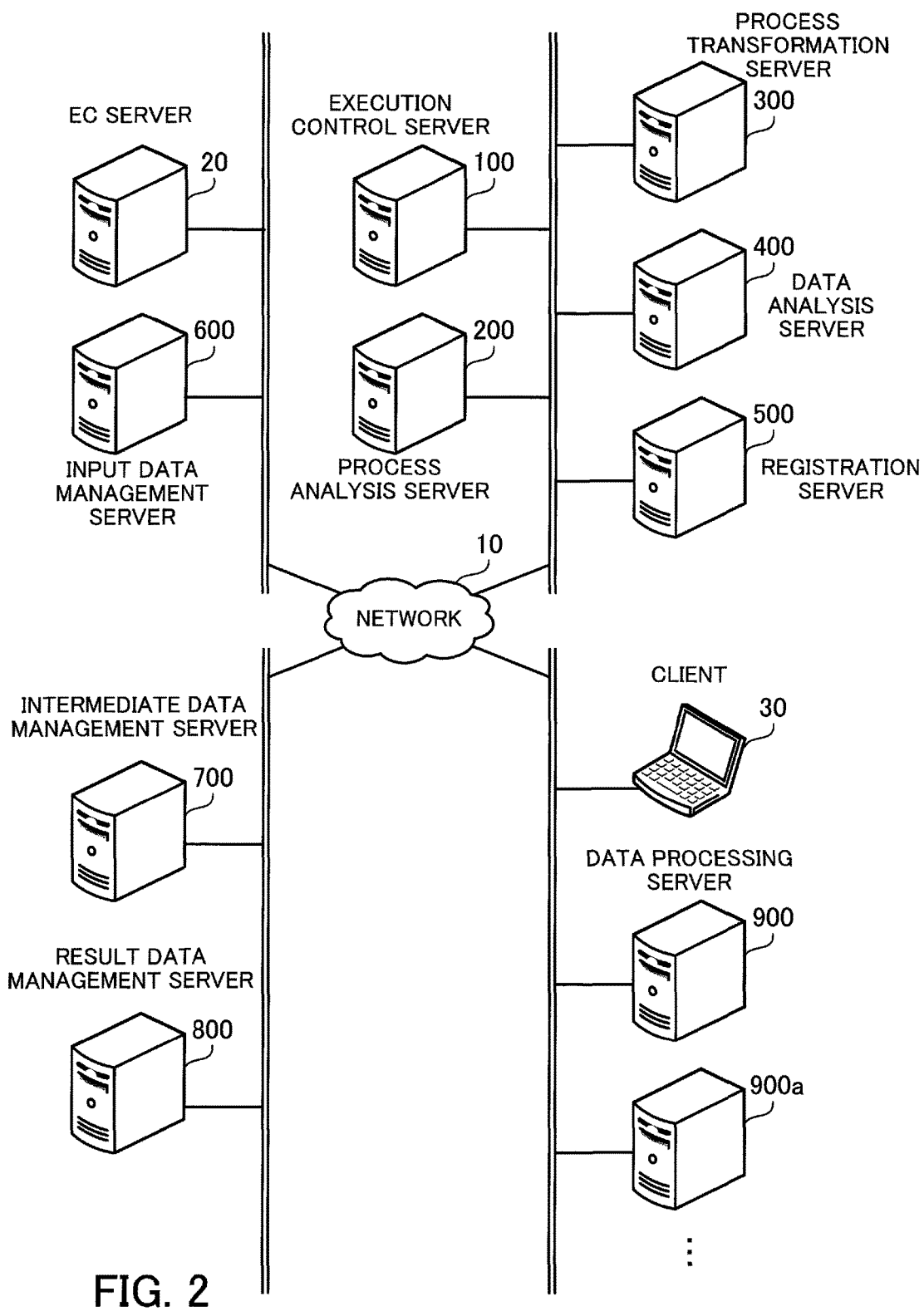
FIG. 2 illustrates a distributed processing system according to a second embodiment.

FIG. 2 illustrates a distributed processing system according to a second embodiment. The distributed processing system of the second embodiment splits input data and causes a plurality of nodes to process the data in a distributed manner. In e-commerce, the distributed processing system of the second embodiment receives the rating values of products given by a user, and extracts products to be recommended to the user on the basis of the rating values. More specifically, the distributed processing system extracts, as recommended products, products that are predicted to be highly rated by the user, on the basis of correlations of rating value for each product between the user and other users. The distributed processing system of the second embodiment processes large amount of rating value data for a large number of users and a large number of products in a distributed manner, so as to achieve high-speed processing for extracting recommended products. In the following description, information on a rating value predicted for each user with respect to each product, which is output from the distributed processing system of the second embodiment, may be referred to as recommendation information.

It is now assumed that, in the distributed processing system of the second embodiment, MapReduce is employed for distributed processing. For example, Hadoop is a well-known framework for using the MapReduce. In this connection, another technique for the distributed processing may be employed in the system. For example, other techniques for distributed processing include MPI (Message Passing Interface), OpenMP (registered trademark), and so on. Alternatively, for example, there is considered a system that performs distributed processing using execution files generated by a parallelizing compiler.

The distributed processing system of the second embodiment includes an EC (Electronic Commerce) server 20, a client 30, an execution control server 100, a process analysis server 200, a process transformation server 300, a data analysis server 400, a registration server 500, an input data management server 600, an intermediate data management server 700, a result data management server 800, and data processing servers 900, 900a, . . . . Each server is connected to a network 10. The network 10 may be a LAN (Local Area Network), for example. The network 10 is also connected to the Internet (not illustrated).

The EC server 20 is a server computer that controls sales of products through e-commerce. The EC server 20 receives the rating values of products given by users. A user operates, for example, a terminal device (not illustrated) that is capable of performing communication over the Internet, to send the rating values of products to the EC server 20. The EC server 20 stores the received rating values in association with information identifying the user (for example, user name) in the input data management server 600.

The client 30 is a client computer that is operated by an administrator who manages the distributed processing system. The administrator operates the client 30 to send a source program for generating recommendation information to the execution control server 100. The source program is written in, for example, Java (registered trademark). The administrator also operates the client 30 to specify input data to be processed to the execution control server 100.

The execution control server 100 is a server computer that controls the entire distributed processing system. The execution control server 100 controls execution of distributed processing in collaboration with other servers on the basis of the source program received from and the input data specified from the client 30. More specifically, the execution control server 100 sends the source program to the process analysis server 200 to request analysis of the program to identify parts in which parallel processing is possible. The execution control server 100 also requests the process transformation server 300 to perform process transformation for the input data to be processed in parallel. The process transformation is to adjust a process so as to use existing processing results, which improves the efficiency of the distributed processing.

The execution control server 100 controls the distributed processing that is performed by the data processing servers 900, 900a, . . . , on the basis of the transformation result obtained by the process transformation server 300. More specifically, the execution control server 100 assigns individual Map operations or Reduce operations to servers in idle state among the data processing servers 900, 900a, . . . . A node that exercises control, like the execution control server 100, may be called a master.

The process analysis server 200 is a server computer that analyzes the processing logic of a source program. In response to a process analysis request from the execution control server 100, the process analysis server 200 analyzes the source program to identify parts in which parallel processing is possible. The process analysis server 200 returns the analysis result to the execution control server 100.

The process transformation server 300 is a server computer that performs process transformation for parallel processing, in response to a process transformation request from the execution control server 100. More specifically, the process transformation server 300 adjusts a process for a block (segment) of input data for which previous calculation results are available so as to use the previous calculation results. The process transformation server 300 requests the data analysis server 400 to analyze the input data to identify data blocks for which previous processing results are available. The process transformation server 300 returns the result of the process transformation to the execution control server 100.

The data analysis server 400 is a server computer that analyzes input data in response to an analysis request from the process transformation server 300. More specifically, the data analysis server 400 accesses the intermediate data management server 700 to search for the previous calculation results with respect to the data blocks included in the input data. The data analysis server 400 classifies the input data into: (1) data blocks that need to be subjected to calculation; and (2) data blocks that have previously been processed. The data analysis server 400 further classifies (2) the data blocks that have previously been processed into: (2-1) data blocks for which there are no available processing results; and (2-2) data blocks for which there are available processing results. The data analysis server 400 returns the analysis result to the process transformation server 300.

The registration server 500 is a server computer that registers data. The registration server 500 obtains data generated through the distributed processing performed by the data processing servers 900, 900a, . . . , and stores the data in the intermediate data management server 700 or the result data management server 800.

The input data management server 600 is a server computer that manages input data. The input data is made up of a registration date, information identifying a user, and a rating value of a product given by the user.

The intermediate data management server 700 is a server computer that manages intermediate data. The intermediate data is data that is generated in the middle of the distributed processing. The intermediate data includes the results of a Map operation.

The result data management server 800 is a server computer that manages result data. The result data is data that is generated as a result of the distributed processing. The result data includes the results of a Reduce operation and finally generated recommendation information.

The data processing servers 900, 900a, . . . are server computers that process data in parallel. Each of the data processing servers 900, 900a, . . . performs an individual Map operation or Reduce operation assigned by the execution control server 100. Nodes in charge of such parallel data processing may be called workers or slaves.

Figure 3:
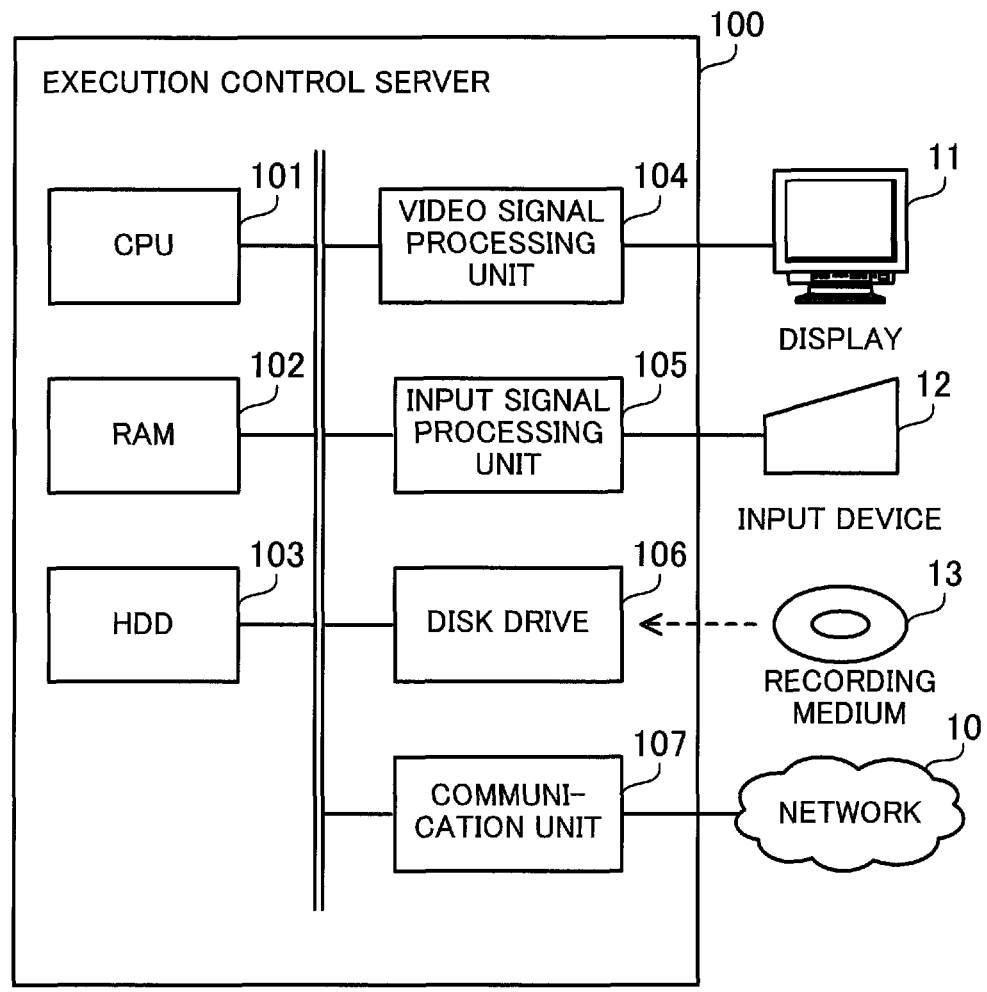
FIG. 3 illustrates an example of a hardware configuration of an execution control server.

FIG. 3 illustrates an example of a hardware configuration of an execution control server. The execution control server 100 includes a CPU 101, a RAM 102, a HDD 103, a video signal processing unit 104, an input signal processing unit 105, a disk drive 106, and a communication unit 107. Each unit is connected to a bus of the execution control server 100. The other servers and the client 30 may be configured with the same hardware units as the execution control server 100.

The CPU 101 is a processor that controls information processing that is performed by the execution control server 100. The CPU 101 loads at least part of a program and data from the HDD 103 to the RAM 102, and executes the program. In this connection, the execution control server 100 may be equipped with a plurality of processors to execute a program in a distributed manner.

The RAM 102 is a volatile memory that temporarily stores a program to be executed by the CPU 101 and data to be used in processing. In this connection, the execution control server 100 may be equipped with another kind of memory than RAM or a plurality of memories.

The HDD 103 is a non-volatile storage device that stores programs, such as OS (Operating System) program, application program, and other programs, and data. The HDD 103 performs data read and write operations on a built-in magnetic disk in accordance with instructions from the CPU 101. In this connection, the execution control server 100 may be equipped with another kind of non-volatile storage device (for example, SSD or the like) than HDD or a plurality of storage devices.

The video signal processing unit 104 outputs video to a display 11 connected to the execution control server 100 in accordance with instructions from the CPU 101. As the display 11, for example, a CRT (Cathode Ray Tube) display, a liquid crystal display, or another display may be used.

The input signal processing unit 105 receives an input signal from an input device 12 connected to the execution control server 100, and outputs the input signal to the CPU 101. As the input device 12, for example, a pointing device, such as a mouse, a touch panel, or another, a keyboard, or another device may be used.

The disk drive 106 is a driving device that reads programs and data from a recording medium 13. As the recording medium 13, for example, a magnetic disk, such as a flexible disk (FD), an HDD, or another, an optical disc, such as a CD (Compact Disc), or a Digital Versatile Disc (DVD), or another, or a Magneto-Optical disk (MO) may be used. The disk drive 106 stores, for example, a program or data read from the recording medium 13 in the RAM 102 or HDD 103 in accordance with instructions from the CPU 101.

The communication unit 107 is a communication interface that enables communication with another server over the network 10. The communication unit 107 may be a wired communication interface or a wireless communication interface.

Figure 4:
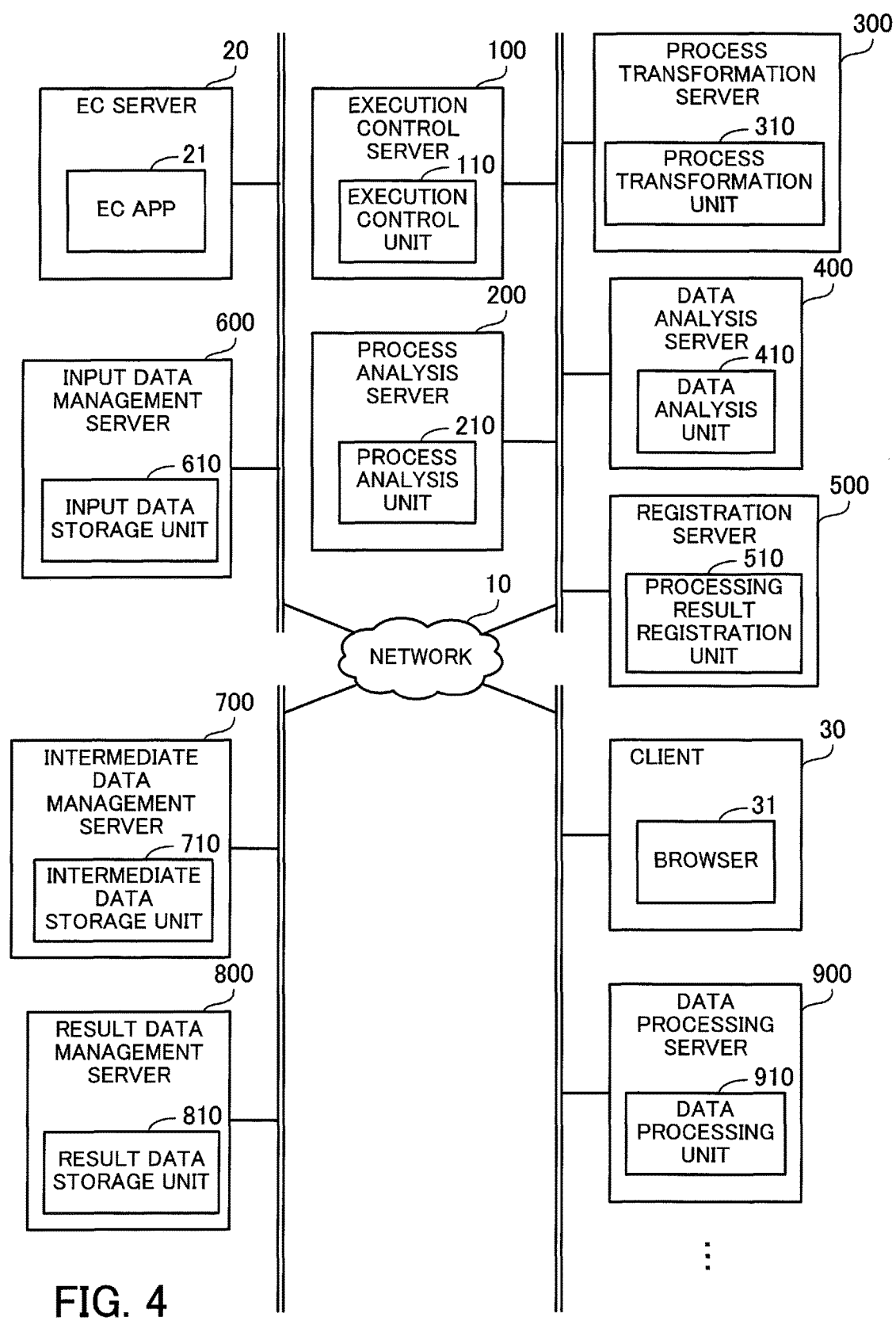
FIG. 4 illustrates an example of a software configuration of the distributed processing system.

FIG. 4 illustrates an example of a software configuration of the distributed processing system. Some or all of the units illustrated in FIG. 4 may be implemented as program modules that are executed by corresponding servers. In addition, some or all of the units illustrated in FIG. 4 may be implemented by using FPGA (Field Programmable Gate Array), ASIC (Application Specific Integrated Circuit), or other electronic circuits. The data processing servers 900a, . . . may be configured with the same units as the data processing server 900.

The EC server 20 includes an EC application (APP) 21. The EC application 21 is application for implementing the e-commerce functions. The EC server 20 functions as a Web server. As a Web application on the Web server, the EC application 21 is accessible from users' terminal devices.

The client 30 includes a browser 31. The browser 31 is a Web browser for Web access to the execution control server 100 (the execution control server 100 also functions as a Web server). The administrator uses the browser 31 to send a processing request to the execution control server 100. Together with the processing request, the administrator is able to send a source program describing the contents of the processing to the execution control server 100 and to specify input data (or a range of input data) to be processed. The processing request from the client 30 to the execution control server 100 may be made using, for example, a CLI (Command Line Interface).

The execution control server 100 includes an execution control unit 110. The execution control unit 110 controls execution of distributed processing. The execution control unit 110 starts to generate recommendation information in response to a processing request from the client 30. The execution control unit 110 sends a source program to the process analysis server 200 to request analysis of the source program to identify parallelizable parts. The execution control unit 110 then requests the process transformation server 300 to request process transformation by specifying the parallelizable parts of the source program. The execution control unit 110 assigns individual Map operations and Reduce operations to the data processing servers 900, 900a, . . . , on the basis of the transformation result. The execution control unit 110 then returns recommendation information generated by the distributed processing to the client 30.

The process analysis server 200 includes a process analysis unit 210. The process analysis unit 210 analyzes a source program received from the execution control unit 110 to identify parts in which parallel data processing is possible. The parts in which parallel data processing is possible may be identified based on, for example, whether data parallelism exists or not. When the data parallelism exists, there are the following characteristics: (1) a result obtained by splitting and separately processing input data is the same as a result obtained by processing the data without splitting the data; and (2) a process does not depend on other processes (previous and subsequent processes). The data parallelism is described in, for example, the following document.

[Document Relating to Data Parallelism]

David Culler and Jaswinder Pal Singh, "Parallel Computer Architecture: A Hardware/Software Approach (The Morgan Kaufmann Series in Computer Architecture and Design)", August 1998

The process analysis unit 210 identifies parts in which parallel data processing is possible by detecting prescribed parts that are declaratively written in the source program. More specifically, interfaces of types defined by the MapReduce framework may be detected. In this case, the process analysis unit 210 identifies classes implementing prescribed interfaces ("Mapper", "Reducer", or the like) in a source program, as the parts in which parallel data processing is possible. Alternatively, classes that inherit from prescribed classes ("Mapper", "Reducer", or the like) may be identified as the parts in which parallel data processing is possible.

In this connection, in the case where such parallelizable parts are not explicitly indicated or in the case of a process in which parallelizable parts are not explicitly specified, the process analysis unit 210 may use a parallelizing compiler to identify such parallelizable parts. The identification of parallelizable parts by a parallelizing compiler is described in, for example, the following document.

[Document Relating to Parallelizing Compiler]

Utpal Banerjee, Rudolf Eigenmann, Alexandru Nicolau and David A. Padua, "Automatic Program Parallelization", Proc. of the IEEE (Institute of Electrical and Electronics Engineers), Vol. 81 No. 2, February 1993

The process transformation server 300 includes a process transformation unit 310. The process transformation unit 310 adjusts parallelizable parts identified by the process analysis unit 210 so as to use previous processing results. The process transformation unit 310 requests the data analysis server 400 to identify blocks of input data for which previous processing results are available.

The data analysis server 400 includes a data analysis unit 410. The data analysis unit 410 identifies blocks of input data for which previous processing results are available, and notifies the process transformation unit 310 of the data blocks.

The registration server 500 includes a processing result registration unit 510. The processing result registration unit 510 obtains the results of the Map operations and the Reduce operations performed by the data processing servers 900, 900a, . . . , and stores the results in the intermediate data management server 700 or the result data management server 800.

The input data management server 600 includes an input data storage unit 610. The input data storage unit 610 stores input data.

The intermediate data management server 700 includes an intermediate data storage unit 710. The intermediate data storage unit 710 stores intermediate data.

The result data management server 800 includes a result data storage unit 810. The result data storage unit 810 stores result data.

The data processing server 900 includes a data processing unit 910. When assigned a Map operation by the execution control unit 110, the data processing unit 910 obtains partial data of input data and performs the Map operation. When assigned a Reduce operation by the execution control unit 110, the data processing unit 910 performs the Reduce operation on the result of the Map operation. The logic of the Map and Reduce operations is described in the source program.

Figure 5:
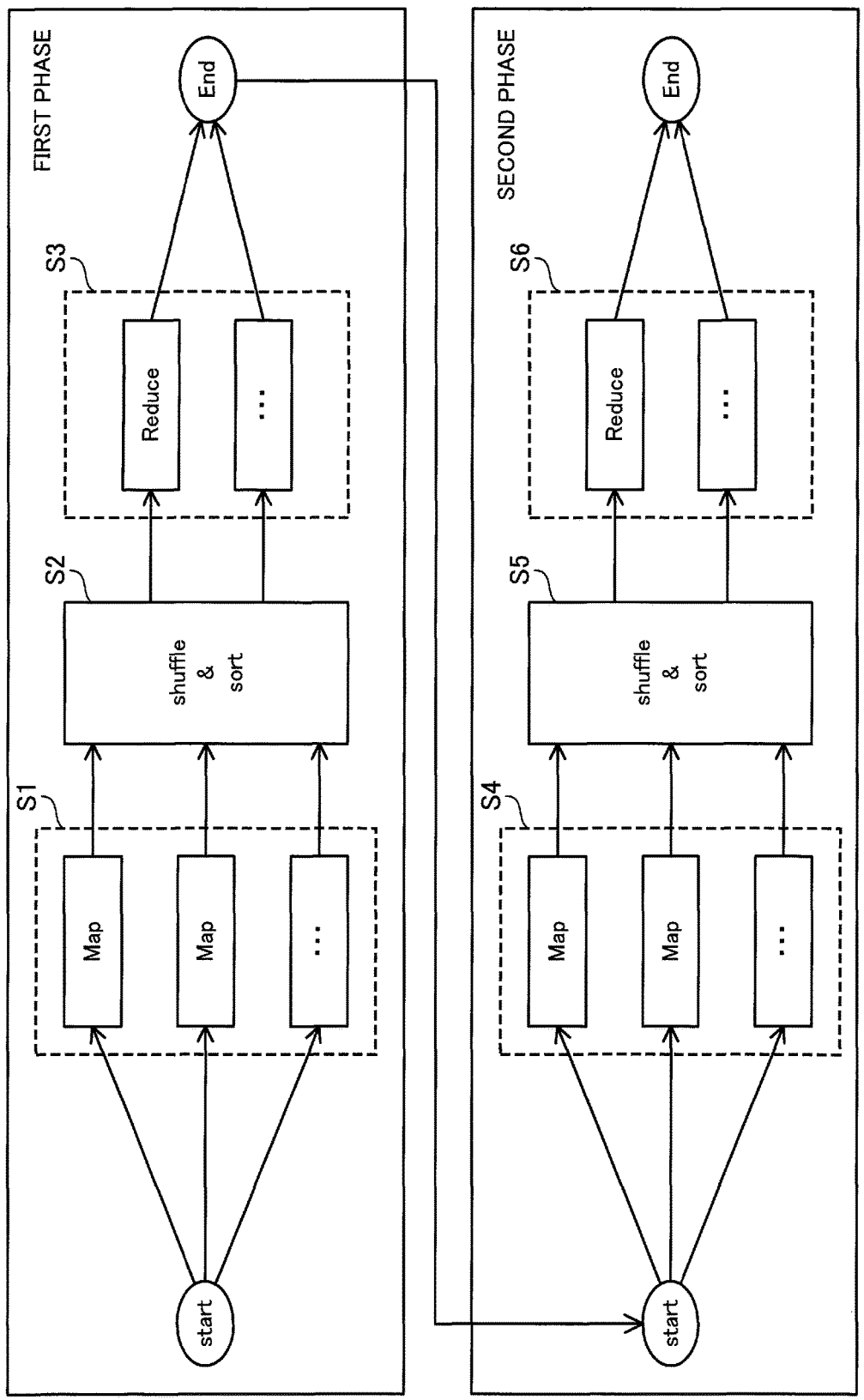
FIG. 5 illustrates an example of distributed processing.

FIG. 5 illustrates an example of distributed processing. The distributed processing system of the second embodiment uses MapReduce in two phases, i.e., a first phase and a second phase, in order to generate recommendation information. The first and second phases are executed by the data processing servers 900, 900a, . . . . As a result of the first and second phases, correlations of rating value between users are obtained. Then, on the basis of the correlations between the users, products that are predicted to be highly rated by each user are extracted and determined as recommended products.

The first phase includes steps S1, S2, and S3. Step S1 is a first Map operation. In step S1, data in csv format is input. The input data includes a user name, information identifying a product, a rating date, and a rating value. In step S1, key-value pairs are generated from the input data. More specifically, a key is information identifying a product. A value is a list of the name of a user that rated the product, a rating value, and a rating date. The processing result registration unit 510 obtains the key-value pairs generated in step S1, and stores them as intermediate data in the intermediate data storage unit 710.

Step S2 is a first shuffle and sort operation. In step S2, the output of step S1 is input. In step S2, the input key-value pairs are sorted by keys and then output.

Step S3 is a first Reduce operation. In step S3, the output of step S2 is input. In step S3, the input data is merged, and new key-value pairs are output. More specifically, a key is information identifying a product, and a value is a list of rating values of the product given by all users.

The second phase includes steps S4, S5, and S6. Step S4 is a second Map operation. In step S4, the output of step S3 is input. In step S4, new key-value pairs are output on the basis of the input data. More specifically, a key is a series of the name of a user and the name of another user. A value is a list of the rating values given by the respective users.

Step S5 is a second shuffle and sort operation. In step S5, the output of step S4 is input. In step S5, the input key-value pairs are sorted by keys and then output.

Step S6 is a second Reduce operation. In step S6, the output of step S5 is input. In step S6, a correlation coefficient between users is obtained based on the input key-value pairs, and is taken as a degree of rating similarity, Similarity (user1, user2). For example, a degree of similarity between a user "Taro" and a user "Jiro" (T and J stand for "Taro" and "Jiro", respectively), Similarity (T, J), is calculated with the following equation (1).

$$\text{Similarity}(T, J) = \frac{\text{Cov}(T, J)}{\sigma_T \sigma_J} \quad (1)$$

$$= \frac{\sum_i (T_i - \overline{T})(J_i - \overline{J})}{\sqrt{\sum_i (T_i - \overline{T})^2} \sqrt{\sum_i (J_i - \overline{J})^2}}$$

Cov(T, J) is a covariance in rating values between the users "Taro" and "Jiro". σT is the standard deviation of the rating values given by "Taro". σJ is the standard deviation of the rating values given by "Jiro". Ti is a rating value given by "Taro" for a product "Item". Ji is a rating value given by "Jiro" for the product "Item". Overlined T and J represent the arithmetic mean of Ti and Ji, respectively.

In the manner described above, the first and second phases are executed to thereby calculate correlation coefficients between users. For example, using the correlation coefficients between the users, a predicted rating value, Rate (T, item) ("T" stands for "Taro"), of the product "Item" for "Taro" is calculated with the following equation (2).

$$\text{Rate}(T, \text{Item}) = \overline{T} + \frac{\sum_{user}\left\{\begin{array}{c}(\text{Rate}(user, \text{Item}) - \overline{user}) * \\ \text{Similarity}(T, user)\end{array}\right\}}{\sum_{user} |\text{Rate}(user, \text{Item})|} \quad (2)$$

In this equation, Σ represents the sum of rating values of the "Item" given by all of users who gave the ratings during a time period specified for the calculation. Overlined "user" represents an arithmetic mean of the rating values given by all the users during the time period.

FIG. 6 illustrates an example of a rating value table. A rating value table 611 is stored in the input data storage unit 610. The rating value table 611 includes the following fields: Date, Product ID (IDentifier), and Rating value.

The Date field contains a date indicating when a rating value was registered. The Product ID field contains information indicating a rated product. The Rating value field contains a rating value given by a user. For example, a rating value of "1" entered by the user "Taro" was registered for a product with a product ID "Item1" on Mar. 1, 2011. In this example, a product with a higher rating value is a higher-rated product.

In this connection, data registered in the rating value table 611 may be stored in another data format such as csv format.

FIG. 7 illustrates an example of an intermediate data table. An intermediate data table 711 is stored in the intermediate data storage unit 710. The intermediate data table 711 includes the following fields: Input Data Hash Value, Data Date, and Intermediate Data.

The Input Data Hash Value field contains the hash value of input data in csv format entered in step S1. The Data Date field contains a range of the dates indicated in the input data. The Intermediate Data field contains intermediate data output in step S1. For example, intermediate data (data name "RESULT 01-05") is registered for the hash value "123a5c" of the input data including the rating values entered between Mar. 1 and Mar. 5, 2011.

Figure 8:
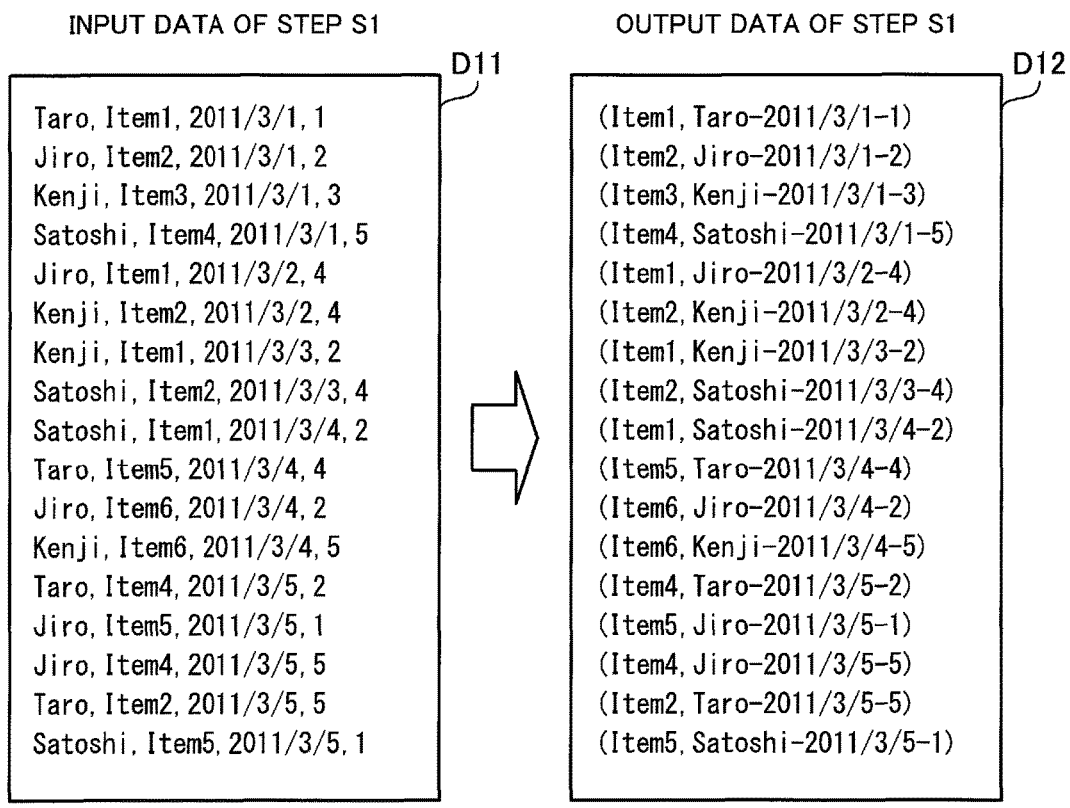
FIG. 8 illustrates an example of input and output data of a first Map operation.

FIG. 8 illustrates an example of input and output data of a first Map operation. Data D11 is input data of step S1 (first Map operation). The data D11 is obtained by extracting data in csv format falling within a time period specified by an administrator from the rating value table 611. The data D11 is made up of information in the order of user name, product ID, rating date, and rating value. Data D12 is output data of step S1. The data D12 is made up of key-value pairs. A key is a product ID included in the data D11. A value includes a user name, a rating date, and a rating value, which are connected with hyphens "-". The first Map class describing the first Map operation is described as follows, for example.

FIG. 9 illustrates an example of a first Map class. A program 911 is part of a source program. The program 911 describes a process of obtaining records one line by one line from the data D11, extracting each of strings delimited by commas ",", and generating the data D12. The first Map class "CollaborativeFiltering_phase1_Map" is a class that implements a "Mapper" interface. In the distributed processing system of the second embodiment, the data parallelization in a process using the method "map" of the first Map class is guaranteed by the definition of the "Mapper" interface type. By detecting that the first Map class implements the "Mapper" interface, the process analysis unit 210 is able to identify the process using the method "map" as a parallelizable part.

Figure 10:
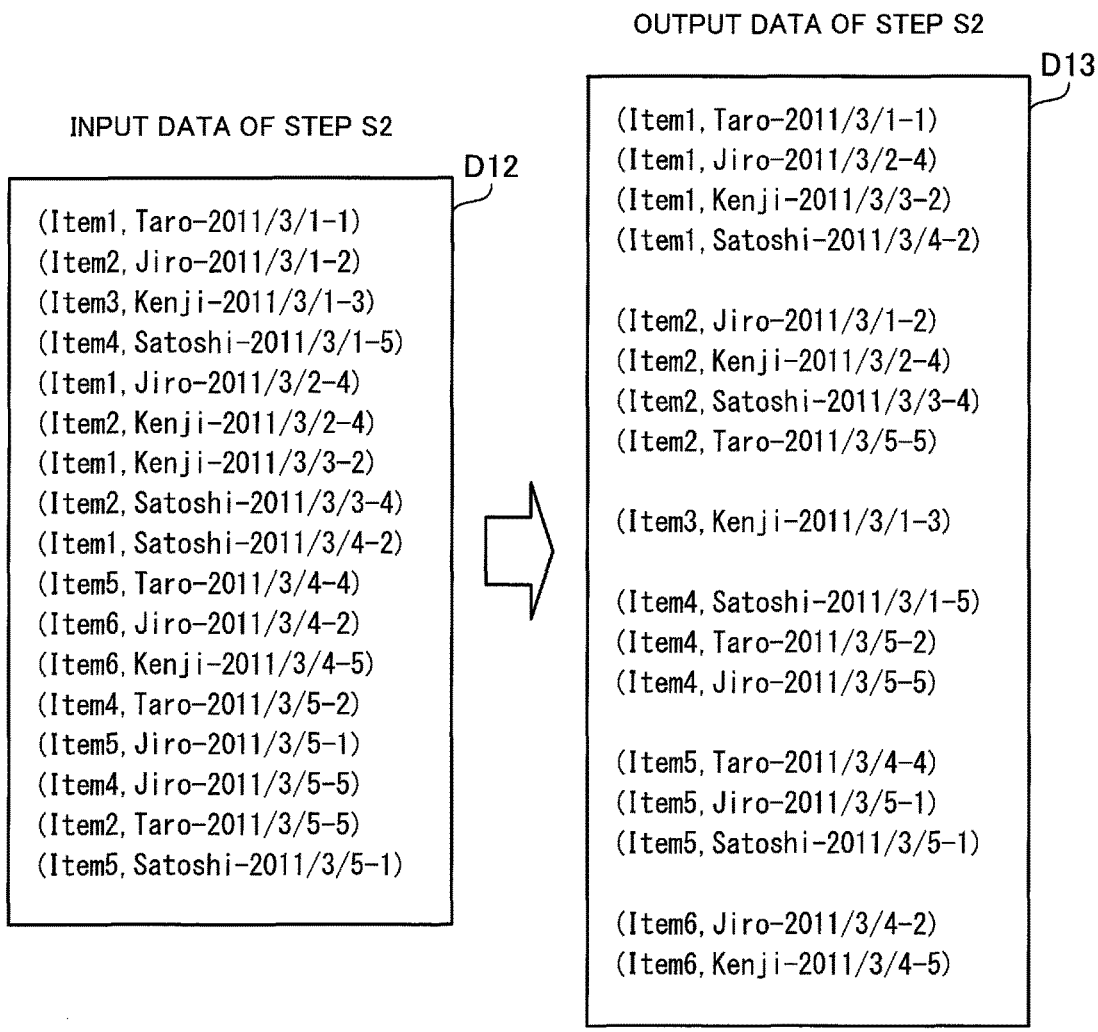
FIG. 10 illustrates an example of input and output data of a first shuffle and sort operation.

FIG. 10 illustrates an example of input and output data of a first shuffle and sort operation. The data D12 is output data of step S1 and is input data of step S2 (first shuffle and sort operation). Data D13 is output data of step S2. The data D13 is generated by sorting the key-value pairs included in the data D12 by keys (product ID).

Figure 11:
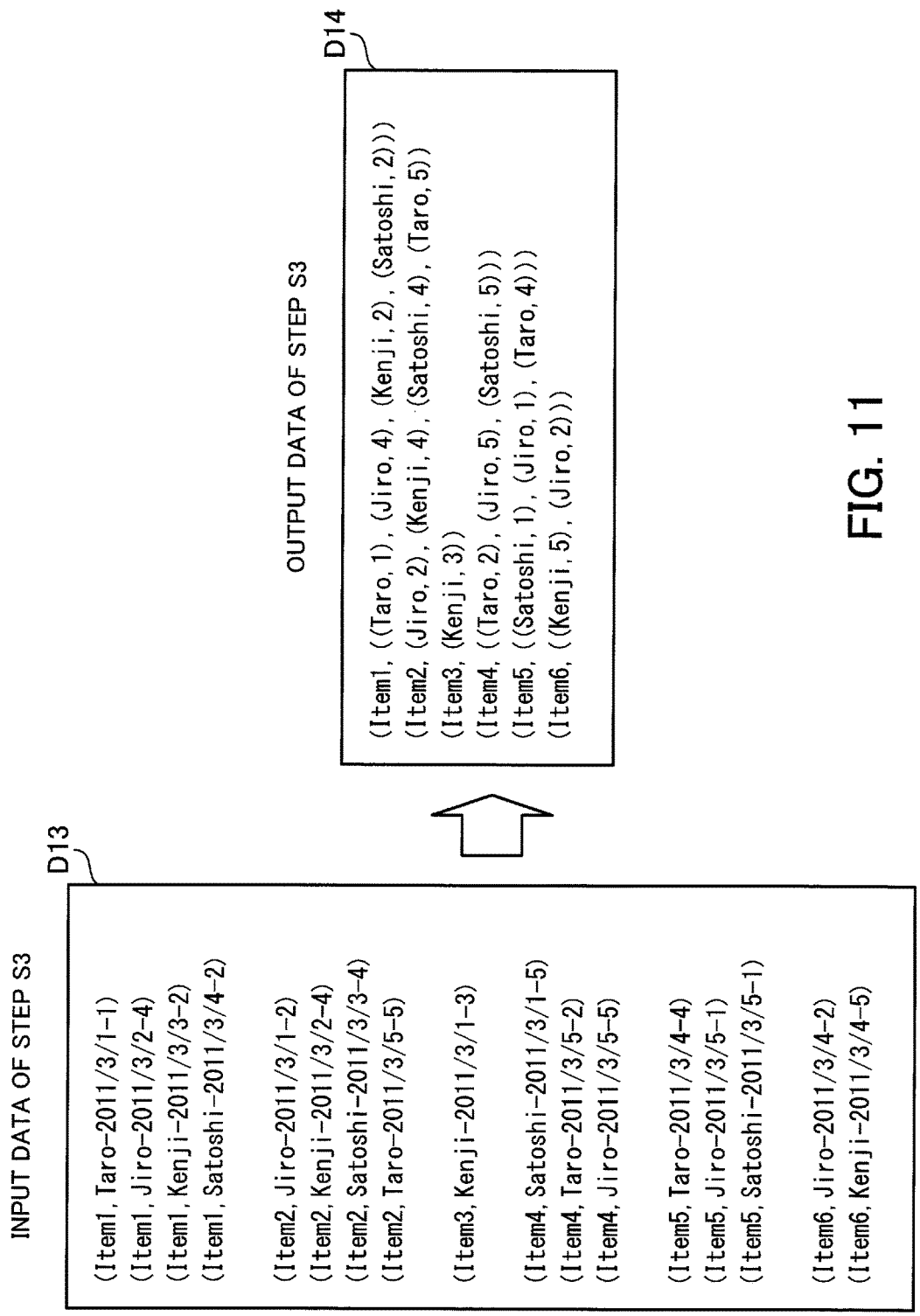
FIG. 11 illustrates an example of input and output data of a first Reduce operation.

FIG. 11 illustrates an example of input and output data of a first Reduce operation. The data D13 is output data of step S2 and is input data of step S3 (first Reduce operation). Data D14 is output data of step S3. The data D14 is generated by merging the key-value pairs included in the data D13 by keys (product ID), and is an aggregation of the rating values given by all users for the individual product IDs. For example, as a value for a key (product ID), a combination of a user and a rating value is extracted for every user who gave the ratings. The data D14 has a format of "(product ID, ((user1, rating value given by user1), (user2, rating value given by user2), . . . ))". In this connection, if a user rated the same product more than once, the latest rating value is used.

FIG. 12 illustrates an example of a first Reduce class. A program 912 is part of a source program. The program 912 describes a process of obtaining records one line by one line from the data D13, extracting each of strings delimited by hyphens "-" from the value associated with each key, and generating the data D14. The first Reduce class "CollaborativeFiltering_phase1_Reduce" is a class that implements a "Reducer" interface. Similarly to the "Mapper" interface, the data parallelism of the first Reduce class is guaranteed by the definition of the "Reducer" interface type. Therefore, a process using the method "Reduce" of the first Reduce class is also a parallelizable part.

Figure 13:
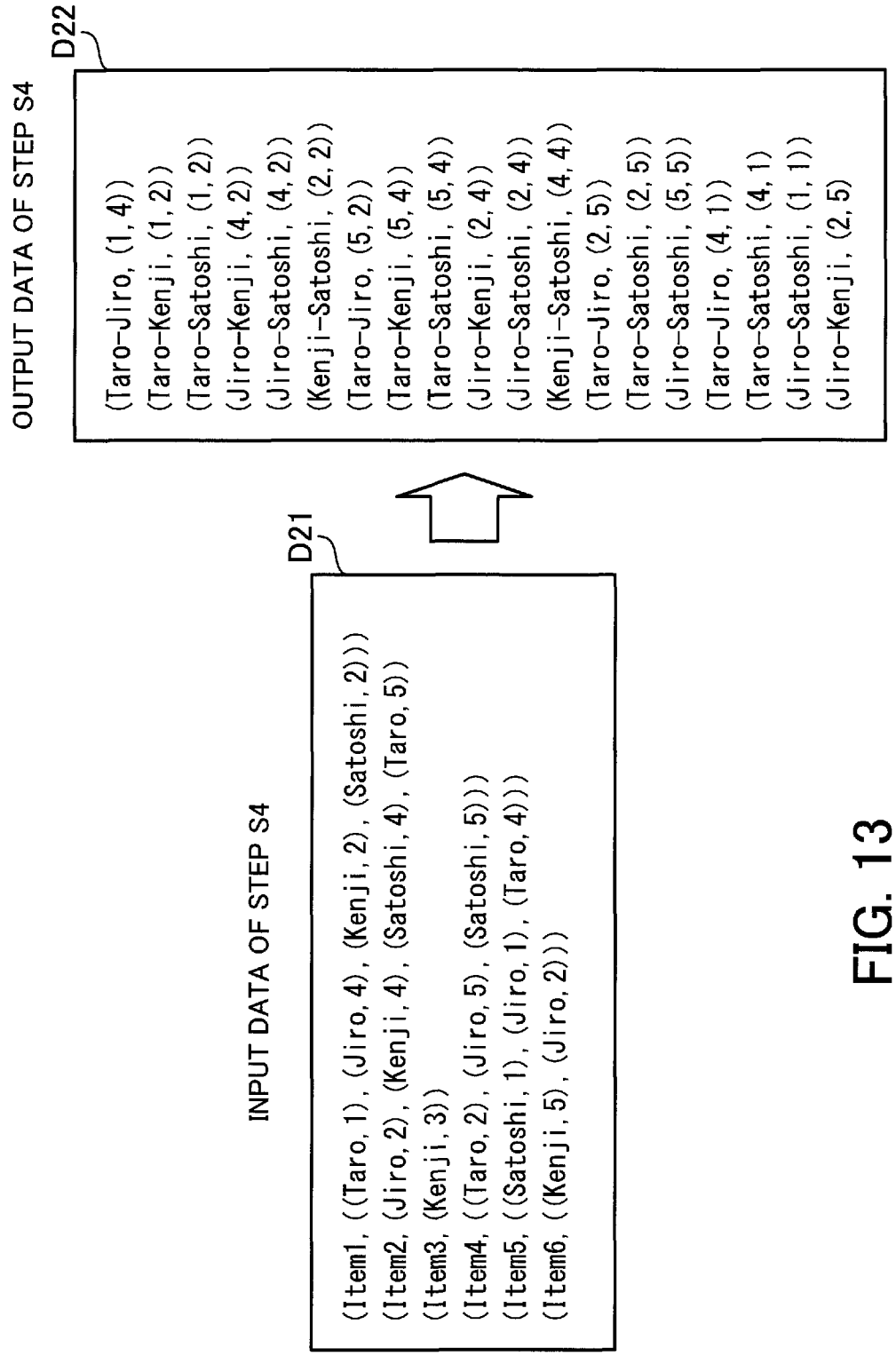
FIG. 13 illustrates an example of input and output data of a second Map operation.

FIG. 13 illustrates an example of input and output data of a second Map operation. Data D21 is output data of step S3 and is input data of step S4 (second Map operation). Data D22 is output data of step S4. The data D22 is new key-value pairs generated based on the data D21. More specifically, with respect to each line of the data D21, a pair of users who gave the ratings is extracted as a key, and a pair of the rating values given by the extracted users is used as a value. In the data D22, a key is a series of user names connected with hyphens "-" (for example, "Taro-Jiro"). A value is a list of the rating values given by the users, which are delimited by commas "," (for example, "(1, 4)").

Figure 14:
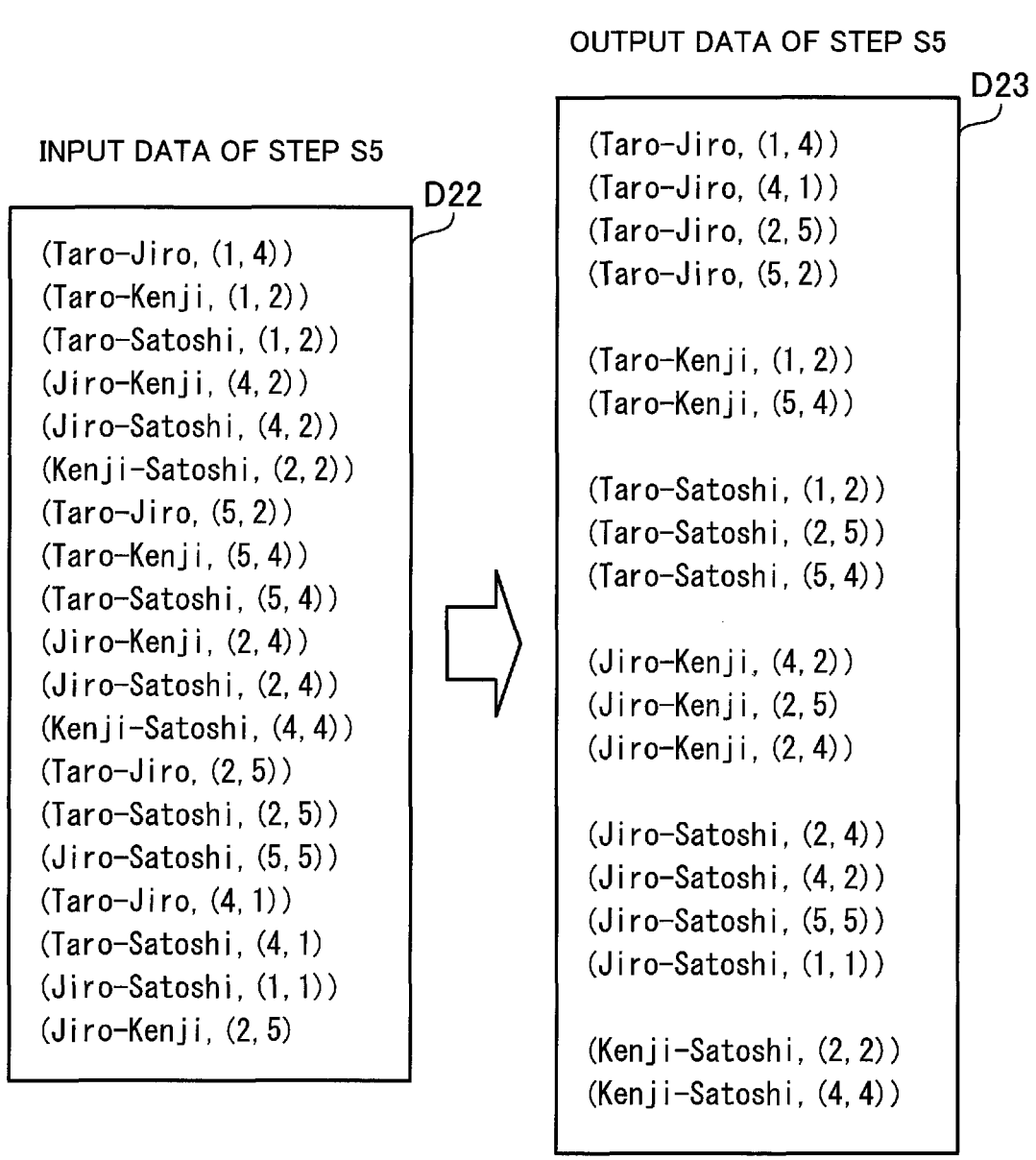
FIG. 14 illustrates an example of input and output data of a second shuffle and sort operation.

FIG. 14 illustrates an example of input and output data of a second shuffle and sort operation. The data D22 is output data of step S4 and is input data of step S5 (second shuffle and sort operation). Data D23 is output data of step S5. The data D23 is generated by sorting the key-value pairs included in the data D22 by keys (a pair of user names).

Figure 15:
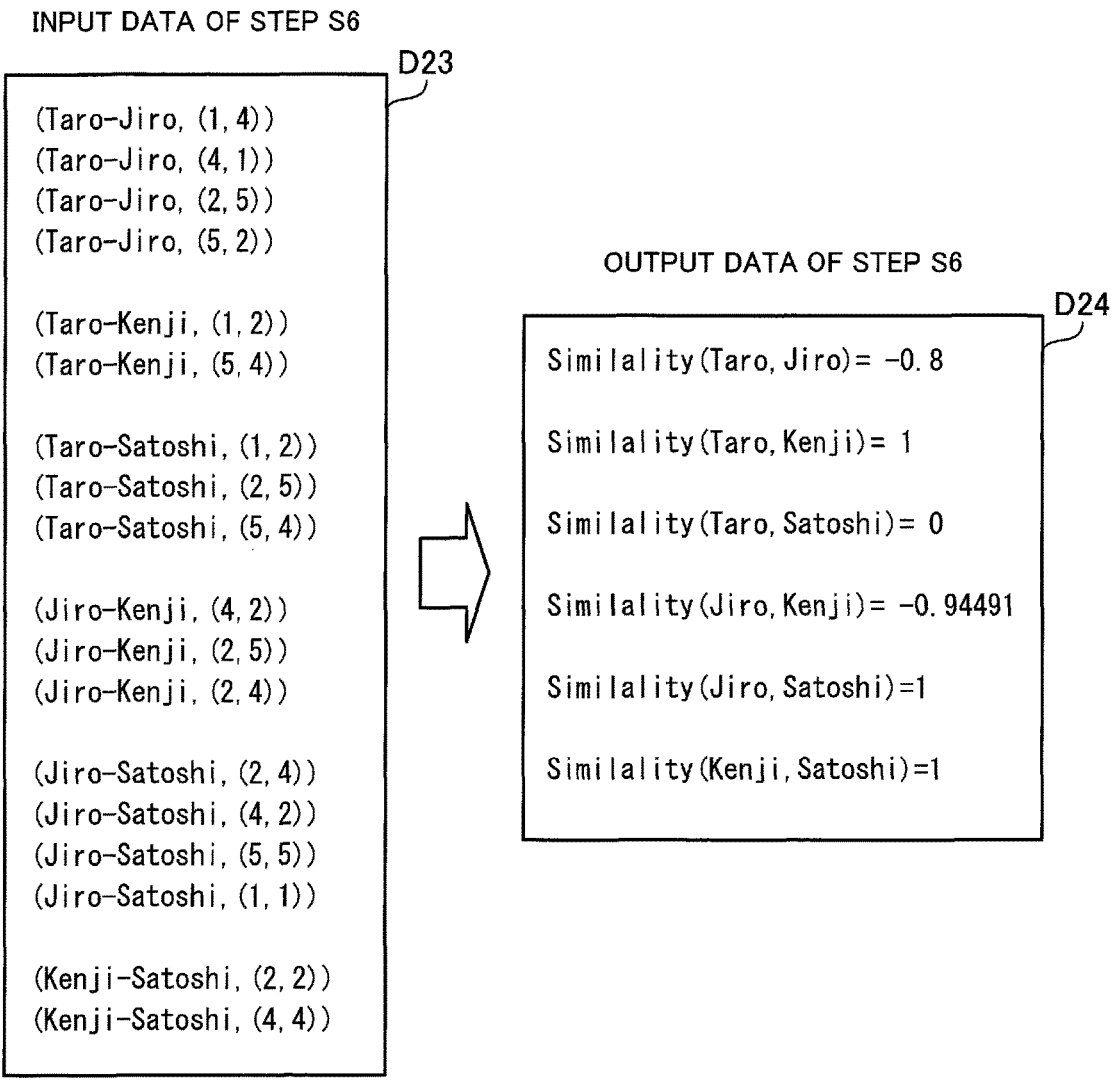
FIG. 15 illustrates an example of input and output data of a second Reduce operation.

FIG. 15 illustrates an example of input and output data of a second Reduce operation. The data D23 is output data of step S5 and is input data of step S6 (second Reduce operation). Data D24 is output data of step S6, and is generated from the data D23. Each line of the data D24 indicates a degree of similarity (correlation coefficient) between users, calculated based on the data D23 with the equation (1).

Figure 16:
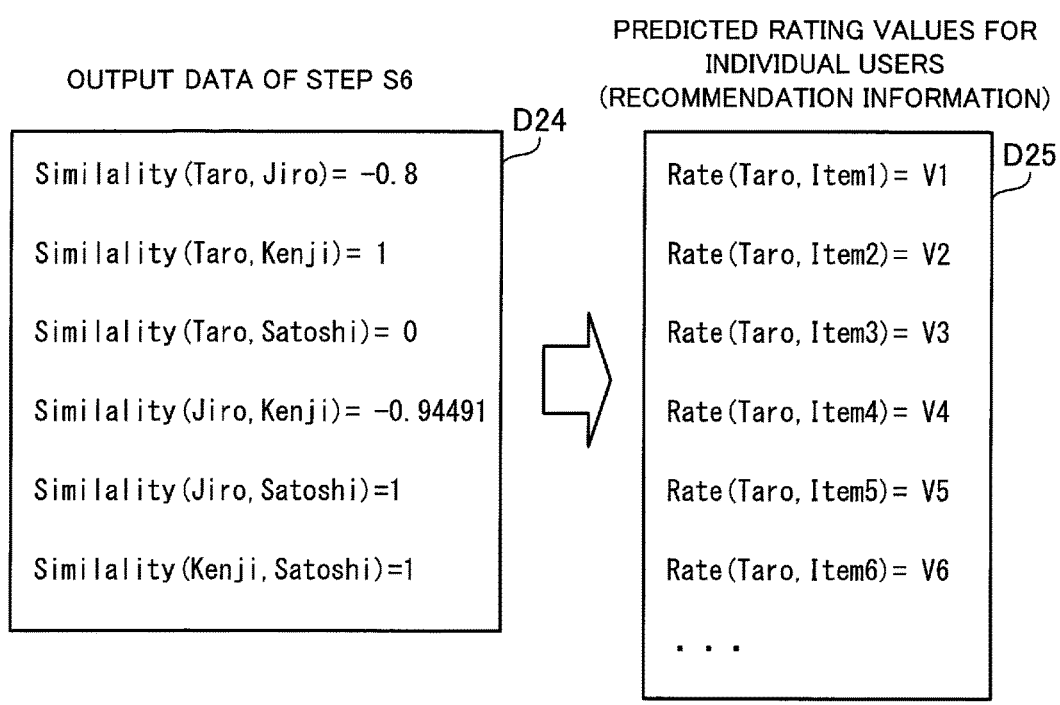
FIG. 16 illustrates an example of recommendation information.

FIG. 16 illustrates an example of recommendation information. The data D24 is output data of step S6. Data D25 lists predicted rating values for individual users with respect to each product, calculated with the equation (2) using the degrees of similarity between users, and is recommendation information to be used for extracting recommended products. For example, in the case where three recommended products are extracted for a user "Taro", three highest Rates (Taro, Item) are selected from the data D25, and the corresponding products are identified.

Figure 17:
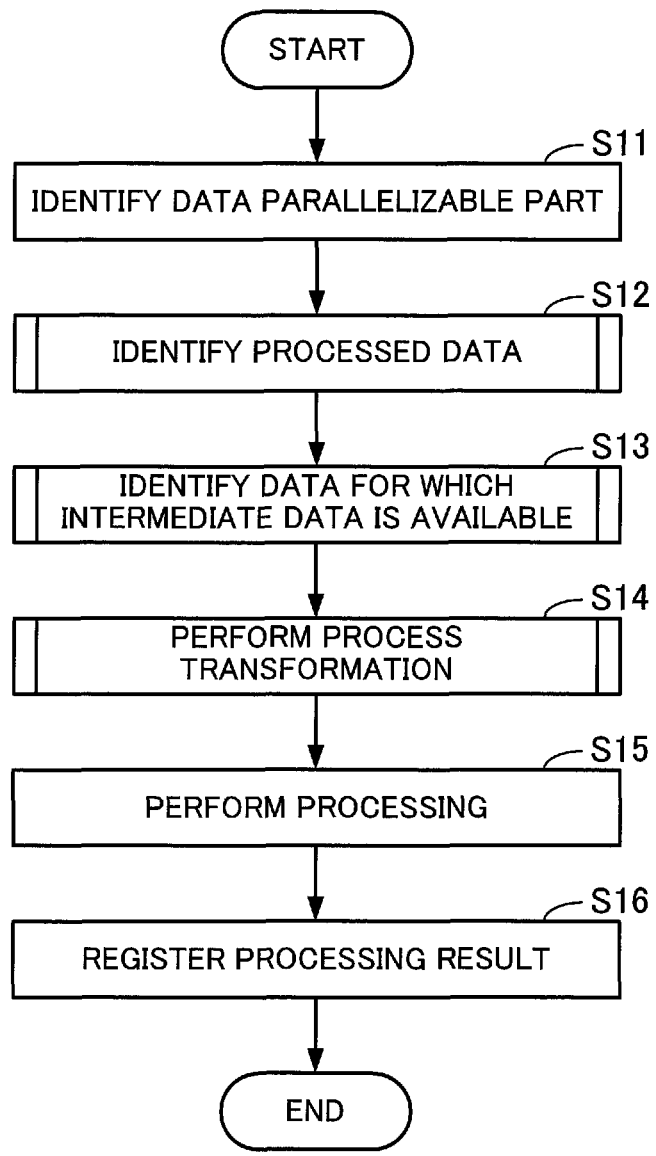
FIG. 17 is a flowchart illustrating an example of how to control distributed processing.

FIG. 17 is a flowchart illustrating an example of how to control distributed processing. The process of FIG. 17 will now be described step by step.

(Step S11) The execution control unit 110 receives, from the client 30, a processing request including a source program to be used for processing and a range of input data to be processed (a range of dates). For example, an administrator uses the browser 31 to enter information (or a path to the information) to be sent to the execution control unit 110. The execution control unit 110 sends a process analysis request to the process analysis unit 210 to analyze the source program. The source program includes the programs 911 and 912 relating to the first phase of the MapReduce job. When detecting that the first Map class included in the program 911 implements a "Mapper" interface, the process analysis unit 210 identifies this part as a data parallelizable part. In addition, when detecting that the first Reduce class included in the program 912 implements a "Reducer" interface, the process analysis unit 210 identifies this part as a data parallelizable part. The process analysis unit 210 notifies the execution control unit 110 of the identified parts. The execution control unit 110 executes the processes described in the source program up to a data parallelizable part.

(Step S12) The execution control unit 110 requests the process transformation unit 310 to perform process transformation with respect to parts for which intermediate data may be available out of the data parallelizable parts. Regarding the first Map operation for which intermediate data may be available, the previous processing results (intermediate data) of the first Map operation are accumulated in the intermediate data table 711 stored in the intermediate data storage unit 710. Since the first Map operation corresponding to the first Reduce operation is a process to generate intermediate data, the process transformation unit 310 starts the process transformation regarding the first Map operation. The process transformation unit 310 requests the data analysis unit 410 to analyze the input data. The data analysis unit 410 identifies data blocks of the input data which have been processed with reference to the intermediate data table 711. The process of this step will be described in detail later.

(Step S13) The data analysis unit 410 identifies data blocks for which intermediate data is available from the processed data blocks identified in step S12. The process of this step will be described in detail later. The data analysis unit 410 returns, to the process transformation unit 310, information indicating, out of the input data, the data blocks that need to be subjected to calculation, the data blocks for which intermediate data is unavailable, and the data blocks for which intermediate data is available.

(Step S14) With respect to the data blocks for which intermediate data is available, the process transformation unit 310 adjusts the process of the first phase so as to use the intermediate data registered in the intermediate data table 711. This transformation process will be described in detail later. The process transformation unit 310 returns the transformation result to the execution control unit 110.

(Step S15) The execution control unit 110 requests the data processing servers 900, 900a, . . . to perform distributed processing, on the basis of the transformation result obtained by the process transformation unit 310. For example, the data processing unit 910 sequentially performs assigned operations, i.e., the first Map operation, the first shuffle and sort operation, the first Reduce operation, the second Map operation, . . . . As data to be processed, the execution control unit 110 notifies the data processing server 900 of the data blocks that need to be subjected to calculation and the data blocks which have been processed but for which intermediate data is unavailable, out of the input data specified by the client 30. The data processing unit 910 outputs intermediate data newly obtained as a result of performing the first Map operation on each data block, to the processing result registration unit 510. In addition, in the first Map operation, with respect to the data blocks for which intermediate data is available, the data processing unit 910 obtains the intermediate data corresponding to the data blocks from the intermediate data table 711 and then performs subsequent operations. Then, the data processing unit 910 generates information on the degrees of similarity between users (data D24) and recommendation information (data D25), and outputs them to the processing result registration unit 510. The data processing units of the data processing servers 900a, . . . operate in the same way as above.

(Step S16) The processing result registration unit 510 collectively registers the intermediate data received from the data processing servers 900, 900a, . . . in the intermediate data table 711. A range of dates of the data included in the intermediate data is also registered. In addition, a hash value of the data blocks of the input data which fall within the range of dates is registered as an index. On the other hand, the processing result registration unit 510 stores the information on the degrees of similarity between users and recommendation information received from the data processing servers 900, 900a, . . . in the result data storage unit 810.

As described above, in the distributed processing system of the second embodiment, a process that uses intermediate data is performed, if the intermediate data is available, in the first Map operation. With respect to data blocks for which intermediate data is unavailable, the first Map operation is performed, and the resulting intermediate data is registered in the intermediate data table 711. This allows the result to be used at a later time for generating recommendation information. The following describes how to execute step S12.

Figure 18:
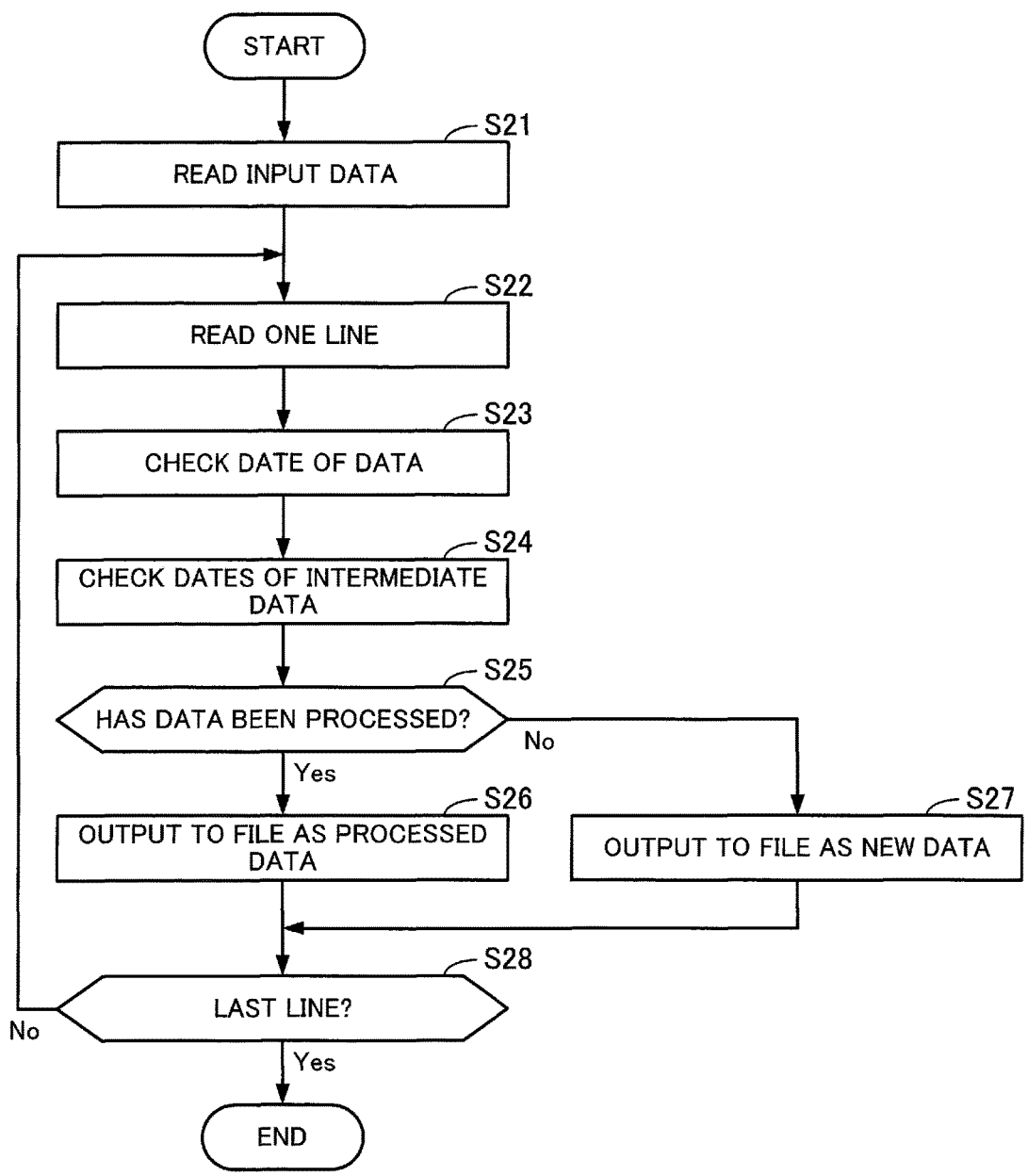
FIG. 18 is a flowchart illustrating an example of how to identify processed data.

FIG. 18 is a flowchart illustrating an example of how to identify processed data. The process of FIG. 18 will be described step by step.

(Step S21) The data analysis unit 410 reads input data specified by the process transformation unit 310. The data analysis unit 410 may obtain the input data from the process transformation unit 310 or may obtain the input data falling within a range of dates specified by the process transformation unit 310, from the rating value table 611 stored in the input data storage unit 610. The process transformation unit 310 obtains the input data in csv format.

(Step S22) The data analysis unit 410 reads one line from the input data.

(Step S23) The data analysis unit 410 obtains a date indicated in the read line.

(Step S24) The data analysis unit 410 obtains the ranges of dates (Data Date field) of the intermediate data included in the intermediate data table 711.

(Step S25) The data analysis unit 410 determines whether the data in the read line of the input data has been processed or not. If the data has been processed, the process proceeds to step S26. If the data has not been processed, the process proceeds to step S27. The data analysis unit 410 determines whether the data in the read line has been processed or not, based on whether the date indicated in the line is included in the data dates registered in the intermediate data table 711 or not. If the date is included, the data is determined to have been processed. If the date is not included, the data is determined to have not been processed.

(Step S26) The data analysis unit 410 outputs the line read in step S22 to a file as processed data. Then, the process proceeds to step S28.

(Step S27) The data analysis unit 410 outputs the line read in step S22 to a file as new data. Then, the process proceeds to step S28.

(Step S28) The data analysis unit 410 determines whether the line read in step S22 is the last line of the input data or not. If the line is not the last line, the process proceeds back to step S22. If the line is the last line, the process is completed.

As described above, the data analysis unit 410 classifies the input data into data blocks that need to be subjected to calculation and data blocks that have been processed, and outputs these data blocks to separate files. With respect to the processed data blocks, the data analysis unit 410 further identifies data blocks for which intermediate data is available. The following describes how to execute step S13 of FIG. 17.

Figure 19:
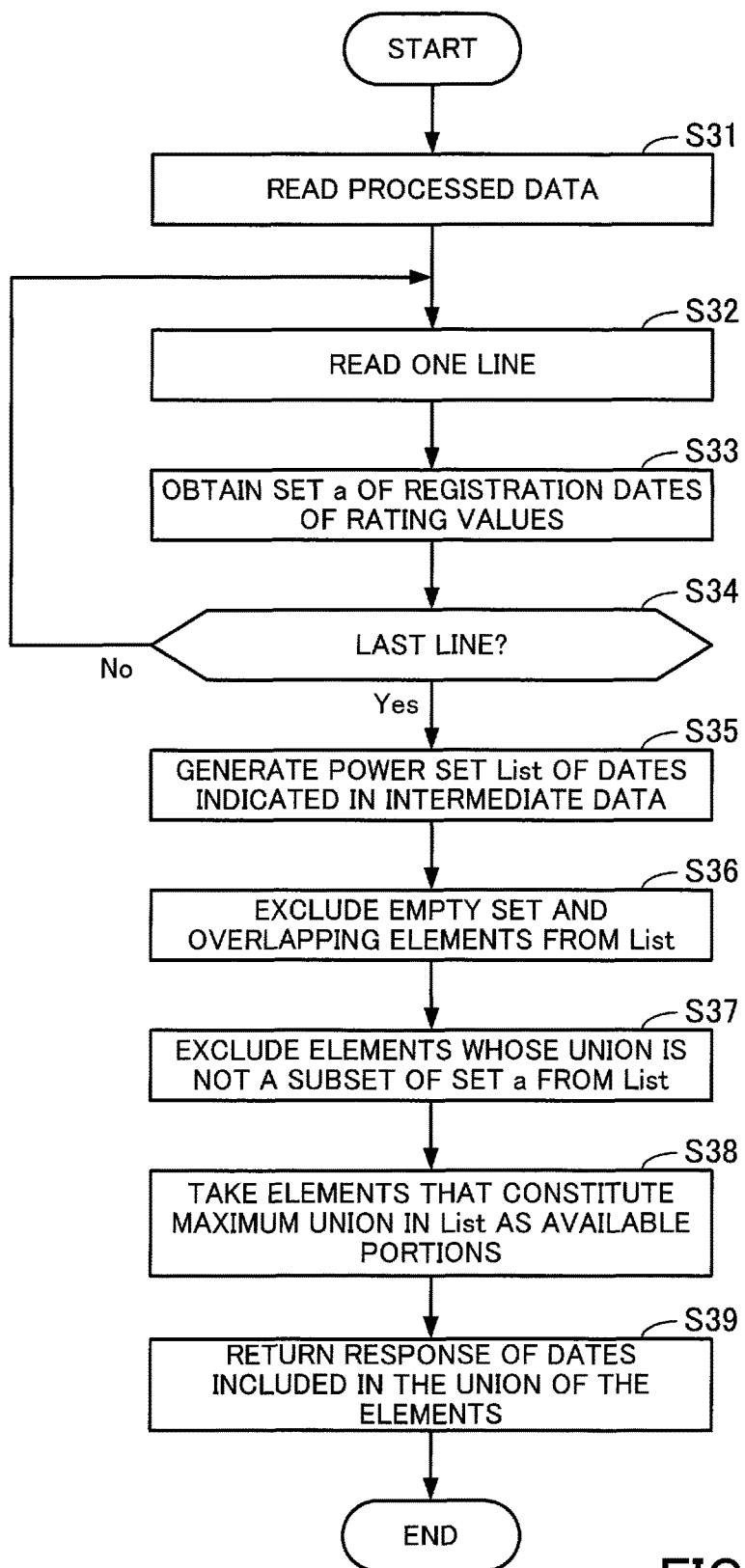
FIG. 19 is a flowchart illustrating an example of how to identify data for which intermediate data is available.

FIG. 19 is a flowchart illustrating an example of how to identify data for which intermediate data is available. The process of FIG. 19 will be described step by step.

(Step S31) The data analysis unit 410 reads processed data that is output in the process of identifying processed data.

(Step S32) The data analysis unit 410 reads one line from the processed data.

(Step S33) The data analysis unit 410 obtains the date indicated in the read line as an element of a set a. The set a is a set of the registration dates of rating values.

(Step S34) The data analysis unit 410 determines whether the line read in step S32 is the last line of the processed data or not. If the line is not the last line, the process proceeds to step S32. If the line is the last line, the process proceeds to step S35. For example, assuming that the dates indicated in the processed data are all the dates in a range of 03/03/2011-03/06/2011, the set a={03/03/2011, 03/04/2011, 03/05/2011, 03/06/2011}.

(Step S35) The data analysis unit 410 generates a power set List of the dates indicated in the intermediate data with reference to the intermediate data table 711. For example, a set List={{φ}, {03/01-03/05/2011}, {03/02-03/05/2011}, . . . , {03/01-03/05/2011, 03/02-03/05/2011}, . . . } is obtained with reference to the intermediate data table 711.

(Step S36) The data analysis unit 410 excludes the empty set {ϕ} and overlapping elements from the set List.

(Step S37) The data analysis unit 410 excludes elements whose union is not a subset of the set a, from the set List.

(Step S38) The data analysis unit 410 takes the elements that constitute the maximum union in the set List as available portions. The maximum union indicates a union including the maximum number of elements, i.e., dates.

(Step S39) The data analysis unit 410 notifies the process transformation unit 310 of the dates included in the union of the elements identified as the available portions in the set List.

As described above, the data analysis unit 410 identifies data blocks for which intermediate data is available from the processed data. Data blocks for which intermediate data is unavailable are to be processed in the first Map operation. That is to say, in the input data, the data blocks that are output to a file as new data in step S27 of FIG. 18 and the data blocks for which intermediate data is unavailable are treated as data blocks that are to be processed in the first Map operation. The following describes step S14 of FIG. 17.

Figure 20:
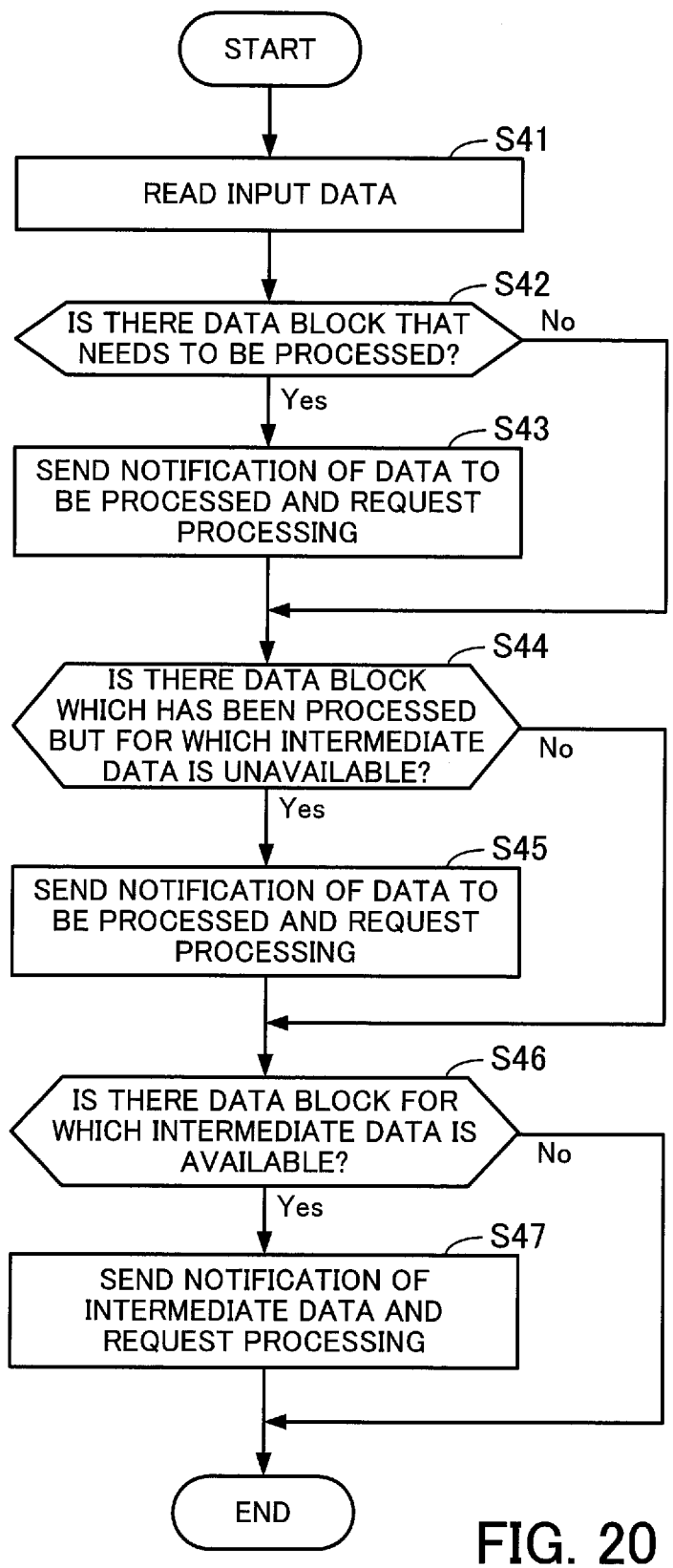
FIG. 20 is a flowchart illustrating an example of how to perform process transformation.

FIG. 20 is a flowchart illustrating an example of how to perform process transformation. The process of FIG. 20 will be described step by step.

(Step S41) The process transformation unit 310 reads the input data.

(Step S42) The process transformation unit 310 determines based on the analysis result obtained by the data analysis unit 410 whether the input data includes a data block that needs to be subjected to calculation or not. If there is a data block that needs to be subjected to calculation, the process proceeds to step S43. If there is no data block that needs to be subjected to calculation, the process proceeds to step S44.

(Step S43) The process transformation unit 310 notifies the execution control unit 110 of the data blocks that need to be subjected to calculation out of the input data and the calculation logic (the "map" method of the first Map operation or the like), and requests processing. On the basis of the notification from the process transformation unit 310, the execution control unit 110 requests the data processing servers 900, 900a, . . . to perform individual first Map operations on the data blocks.

(Step S44) The process transformation unit 310 determines based on the analysis result obtained by the data analysis unit 410 whether or not the input data includes a data block which has been processed but for which intermediate data is unavailable. If there is a data block which has been processed but for which intermediate data is unavailable, the process proceeds to step S45. If there is no data block which has been processed but for which intermediate data is unavailable, the process proceeds to step S46.

(Step S45) As in step S43, the process transformation unit 310 notifies the execution control unit 110 of the data blocks which have been processed but for which intermediate data is unavailable out of the input data and the calculation logic (the "map" method of the first Map operation or the like), and requests processing. On the basis of the notification from the process transformation unit 310, the execution control unit 110 requests the data processing servers 900, 900a, . . . to perform individual first Map operations on the data blocks.

(Step S46) The process transformation unit 310 determines based on the analysis result obtained by the data analysis unit 410 whether or not the input data includes a data block for which intermediate data is available. If there is a data block for which intermediate data is available, the process proceeds to step S47. If there is no data block for which intermediate data is available, the process is completed.

(Step S47) The process transformation unit 310 notifies the execution control unit 110 of the data blocks for which intermediate data is available out of the input data, and requests processing following the first Map operation. On the basis of the notification from the process transformation unit 310, the execution control unit 110 requests the data processing servers 900, 900a, . . . to obtain existing intermediate data for the data blocks, not to perform the first Map operation. In this case, in step S15 of FIG. 17, the data processing unit 910 obtains corresponding intermediate data from the intermediate data storage unit 710, and performs the subsequent first shuffle and sort operation and first Reduce operation. In the case where one or both of steps S43 and S44 are executed, the data processing unit 910 performs the subsequent operations on the corresponding intermediate data and the intermediate data newly obtained in steps S43 and S44.

As described above, the process transformation unit 310 classifies the input data into three groups and makes a processing request to the execution control unit 110. The execution control unit 110 controls the data processing servers 900, 900a, . . . so as to perform distributed processing appropriate for the groups of the input data.

Figure 21:
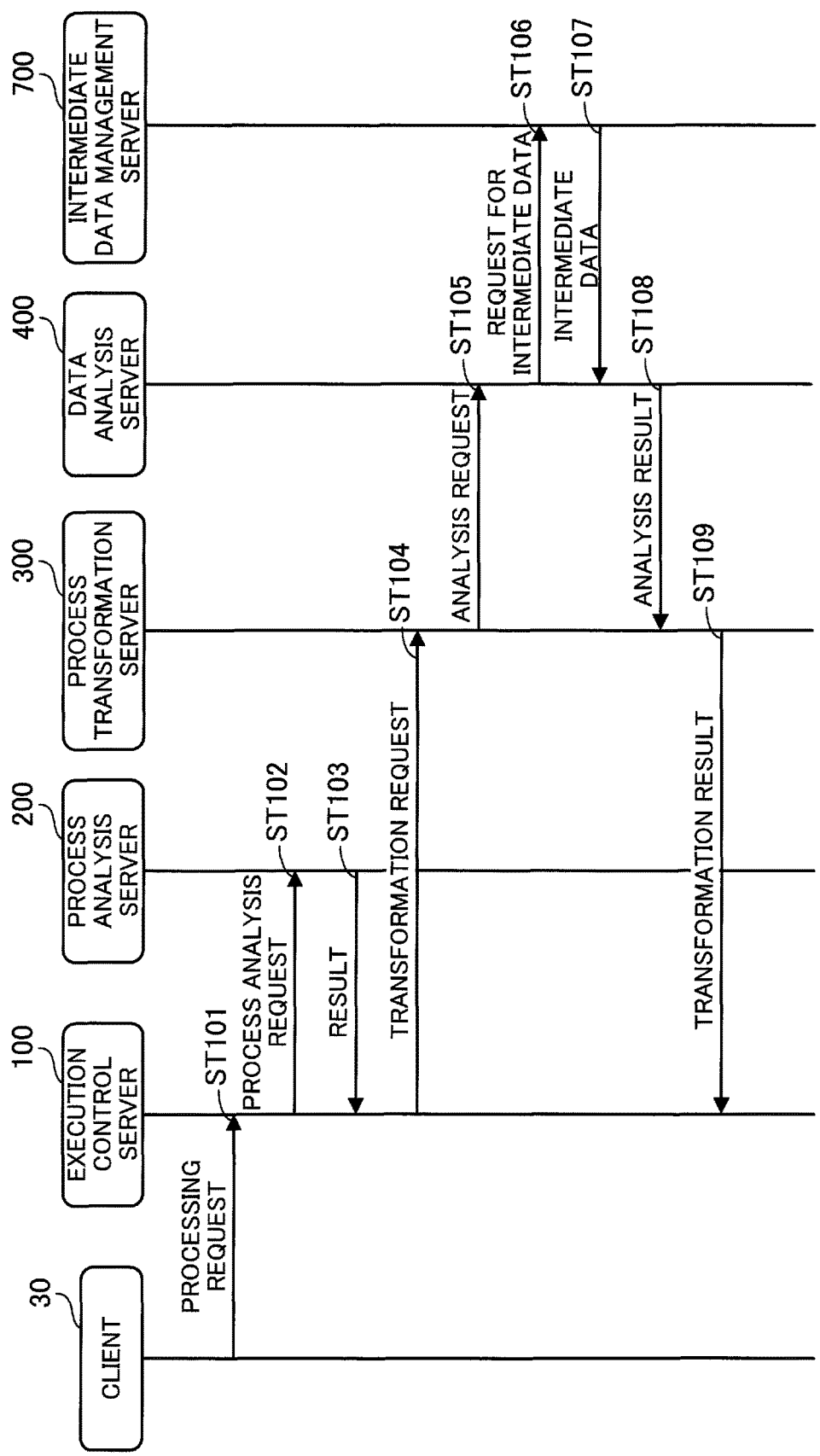
FIG. 21 is a sequence diagram illustrating an example of how to control the distributed processing.

FIG. 21 is a sequence diagram illustrating an example of how to control the distributed processing. The process of FIG. 21 will be described step by step.

(Step ST101) The client 30 sends the execution control server 100 a processing request for generating recommendation information with a source program and a range of dates for input data specified. The execution control server 100 receives the processing request.

(Step ST102) The execution control server 100 sends the process analysis server 200 a process analysis request with the source program specified. The process analysis server 200 receives the process analysis request.

(Step ST103) The process analysis server 200 returns the analysis result to the execution control server 100. The execution control server 100 receives the process analysis result. This analysis result specifies, as data parallelizable parts, step S1 (first Map operation) and step S3 (first Reduce operation) in the first phase of the MapReduce job.

(Step ST104) The execution control server 100 sends the process transformation server 300 a process transformation request for the first Map operation for which intermediate data may be available out of the data parallelizable parts. The process transformation server 300 receives the transformation request.

(Step ST105) The process transformation server 300 sends the data analysis server 400 an analysis request for input data and intermediate data. The data analysis server 400 receives the analysis request.

(Step ST106) The data analysis server 400 requests the intermediate data from the intermediate data management server 700. The intermediate data management server 700 receives the request.

(Step ST107) The intermediate data management server 700 returns the intermediate data with reference to the intermediate data table 711 stored in the intermediate data storage unit 710. The data analysis server 400 receives the returned intermediate data.

(Step ST108) The data analysis server 400 classifies the input data into data blocks that need to be subjected to calculation in the first Map operation and data blocks for which intermediate data is available, on the basis of the range of dates of the input data and the intermediate data. The data analysis server 400 returns the analysis result to the process transformation server 300. The process transformation server 300 receives the returned analysis result.

(Step ST109) The process transformation server 300 splits the input data on the basis of the analysis result, and adjusts a process so as to use intermediate data. The process transformation server 300 returns the transformation result to the execution control server 100.

Figure 22:
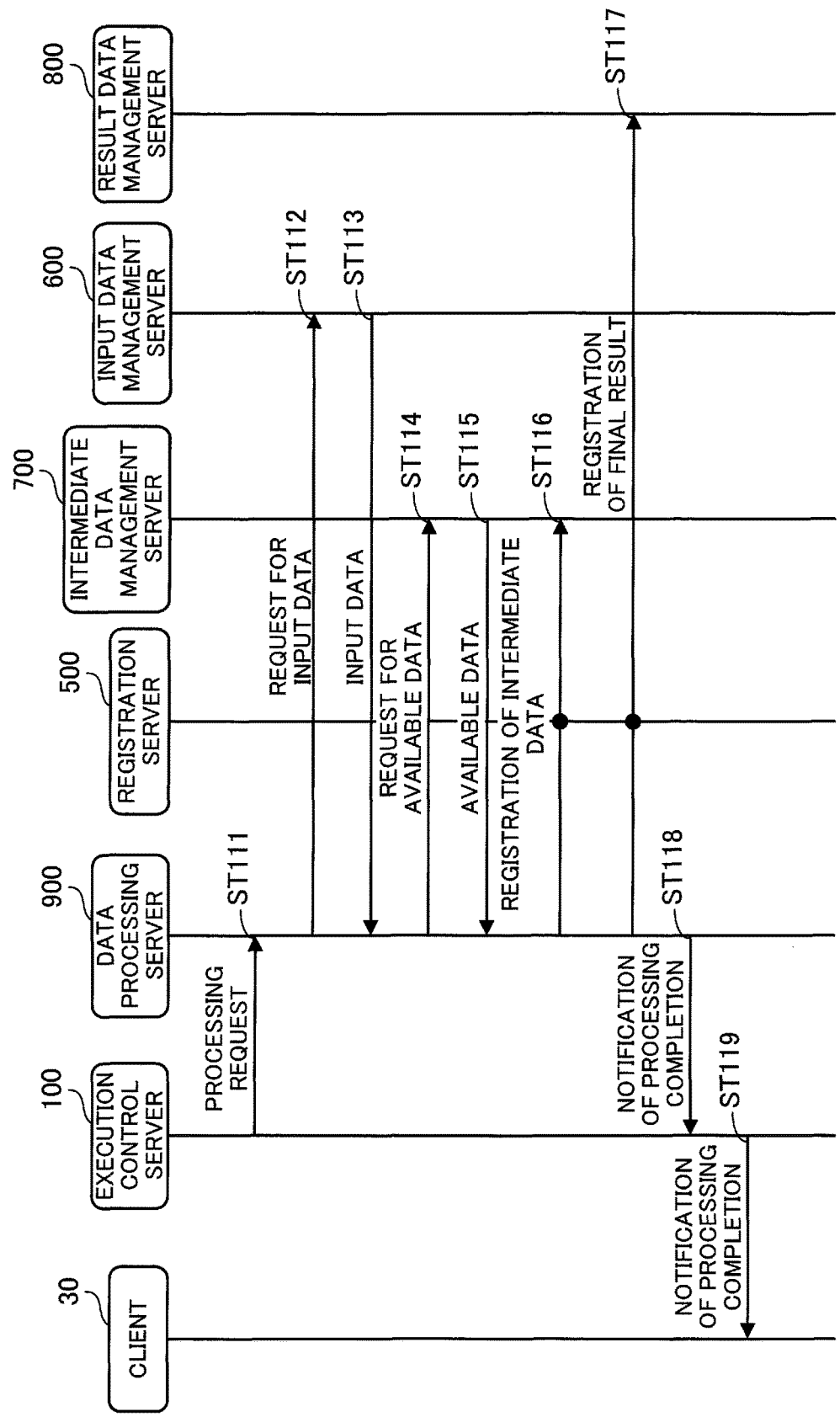
FIG. 22 is a sequence diagram illustrating the example of how to control the distributed processing.

FIG. 22 is a sequence diagram illustrating the example of how to control the distributed processing. The process of FIG. 22 will be described step by step. Although FIG. 22 illustrates the data processing server 900 only, the data processing servers 900a, . . . operate in the same way as the data processing server 900.

(Step ST111) The execution control server 100 sends a processing request for performing operations including the first Map operation to the data processing server 900, 900a, . . . on the basis of the process transformation result obtained by the process transformation server 300. The processing request specifies a range of dates for input data that needs to be subjected to calculation in the first Map operation. The execution control server 100 also sends the data processing server 900, 900a, . . . information on a range of dates indicating blocks of the input data for which intermediate data is available. The information indicating the data blocks for which intermediate data is available may be sent to any one of the data processing servers 900, 900a, . . . . Alternatively, the data blocks for which intermediate data is available may be split and distributed to a plurality of data processing servers.

(Step ST112) The data processing server 900, 900a, . . . requests the input data that needs to be subjected to calculation, from the input data management server 600. In this connection, the data blocks that need to be subjected to calculation are requested by specifying a range of dates. The input data management server 600 receives the request.

(Step ST113) The input data management server 600 responds by returning data falling within the specified range of dates with reference to the input data stored in the input data storage unit 610. The data processing server 900 receives the response.

(Step ST114) The data processing server 900, 900a, . . . requests the intermediate data corresponding to the data blocks for which intermediate data is available, from the intermediate data management server 700. The intermediate data management server 700 receives the request.

(Step ST115) The intermediate data management server 700 obtains the intermediate data falling within the requested range of dates with reference to the intermediate data table 711 stored in the intermediate data storage unit 710, and responds by returning the intermediate data. The data processing server 900, 900a, . . . receives the response.

(Step ST116) The data processing server 900, 900a, . . . executes the first phase of the MapReduce job. In the first Map operation, the data blocks for which intermediate data is available are excluded from being processed. With respect to these data blocks, the intermediate data obtained in step ST115 is treated as their processing results of the first Map operation, and the subsequent operations are performed thereon. When obtaining the intermediate data by performing calculation on data blocks of the input data in the first Map operation at this time, the data processing server 900, 900a, . . . sends the intermediate data to the registration server 500. The registration server 500 stores the intermediate data received from the data processing server 900, 900a, . . . in the intermediate data management server 700.

(Step ST117) The data processing server 900, 900a, . . . executes the second phase of the MapReduce job. Then, when obtaining information on the degrees of similarity between users, the data processing server 900, 900a, . . . generates recommendation information on the basis of the information. In addition, the data processing server 900, 900a, . . . sends the information to the registration server 500. The registration server 500 stores the information on the degrees of similarity between users and the recommendation information received from the data processing server 900, 900a, . . . in the result data management server 800.

(Step ST118) The data processing server 900, 900a, . . . notifies the execution control server 100 of the completion of the processing for generating recommendation information. The execution control server 100 receives the notification.

(Step ST119) The execution control server 100 notifies the client 30 of the completion of the requested processing. The client 30 receives the notification. The administrator is able to use the client 30 and recognize the tendency of users' product ratings with reference to the recommendation information stored in the result data management server 800. In addition, the EC server 20 is able to extract products that are predicted to be highly rated, for each user with reference to the recommendation information, and display the products as recommended products on the browser of the terminal device used by the user.

As described above, the distributed processing is controlled in the distributed processing system.

The following describes a specific process of generating recommendation information. It is assumed that, to generate recommendation information for a certain date, the logs of rating values made in the previous five days are processed. In the following description, a first-round process is to generate recommendation information for Mar. 6, 2011. A second-round process is to generate recommendation information for Mar. 7, 2011. A third process is to generate recommendation information for Mar. 8, 2011. In addition, it is also assumed that no intermediate data is registered in the intermediate data table 711 immediately before the first-round process starts.

Figure 23:
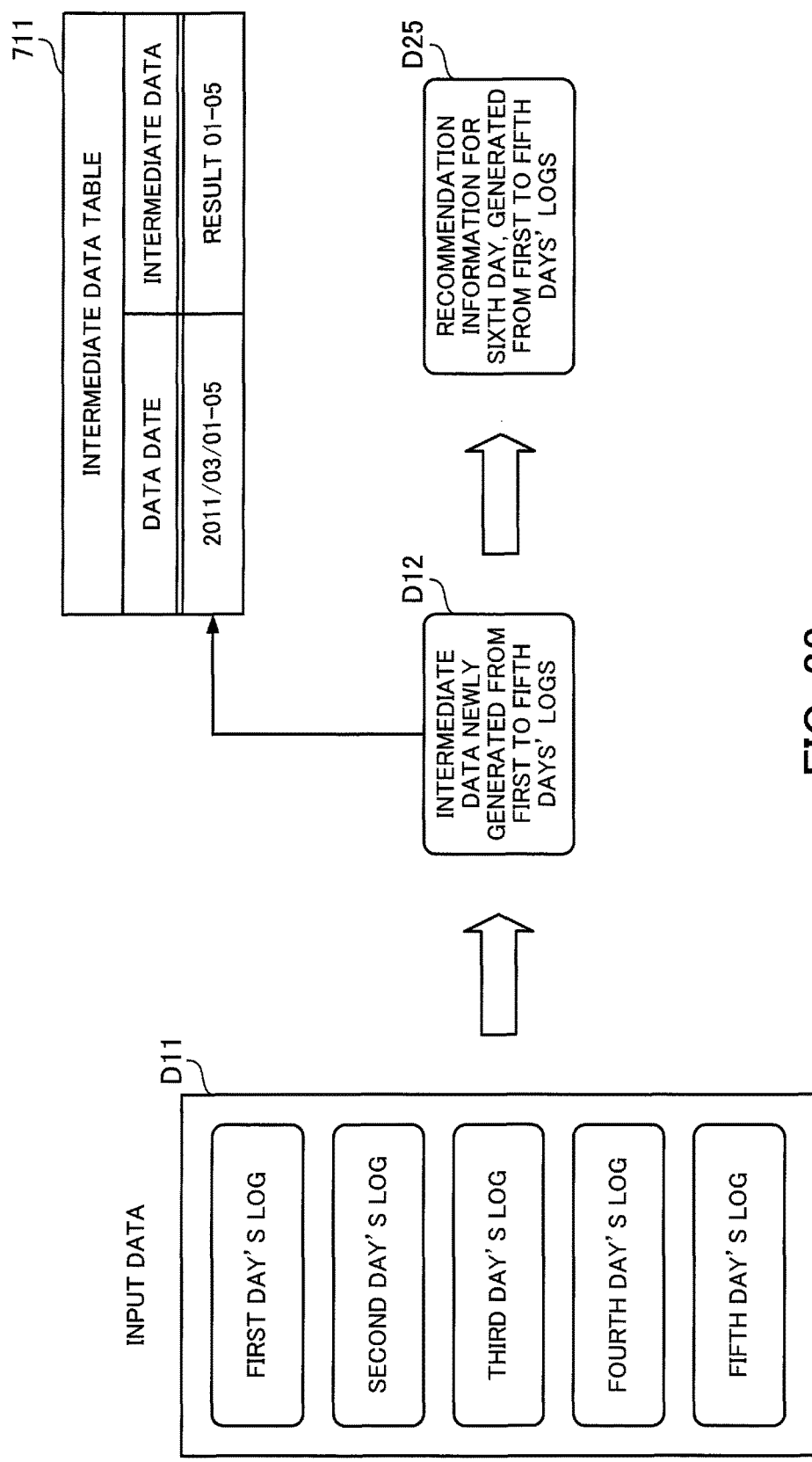
FIG. 23 illustrates an example of a first-round process.

FIG. 23 illustrates an example of a first-round process. Input data in the first-round process is data D11. The data D11 includes the first to fifth days' logs including rating value information (hereinafter, referred to as like "first day's log" simply) entered on Mar. 1, 2011. As a result of inputting the data D11 and performing the first Map operation, data D12 is output. The data D12 is intermediate data newly generated from the first to fifth days' logs. The registration server 500 collects the results of the first Map operation performed by the data processing servers 900, 900a, . . . , generates the data D12, and registers the data D12 together with the range of the dates indicated in the data D12 in the intermediate data table 711. In this connection, in FIG. 23, the Hash Value field in the intermediate data table 711 is not illustrated (the same applies hereafter).

After that, the first shuffle and sort operation, the first Reduce operation, the second Map operation, are sequentially performed to thereby generate data D25. The data D25 is recommendation information for a sixth day, generated from the first to fifth days' logs.

Figure 24:
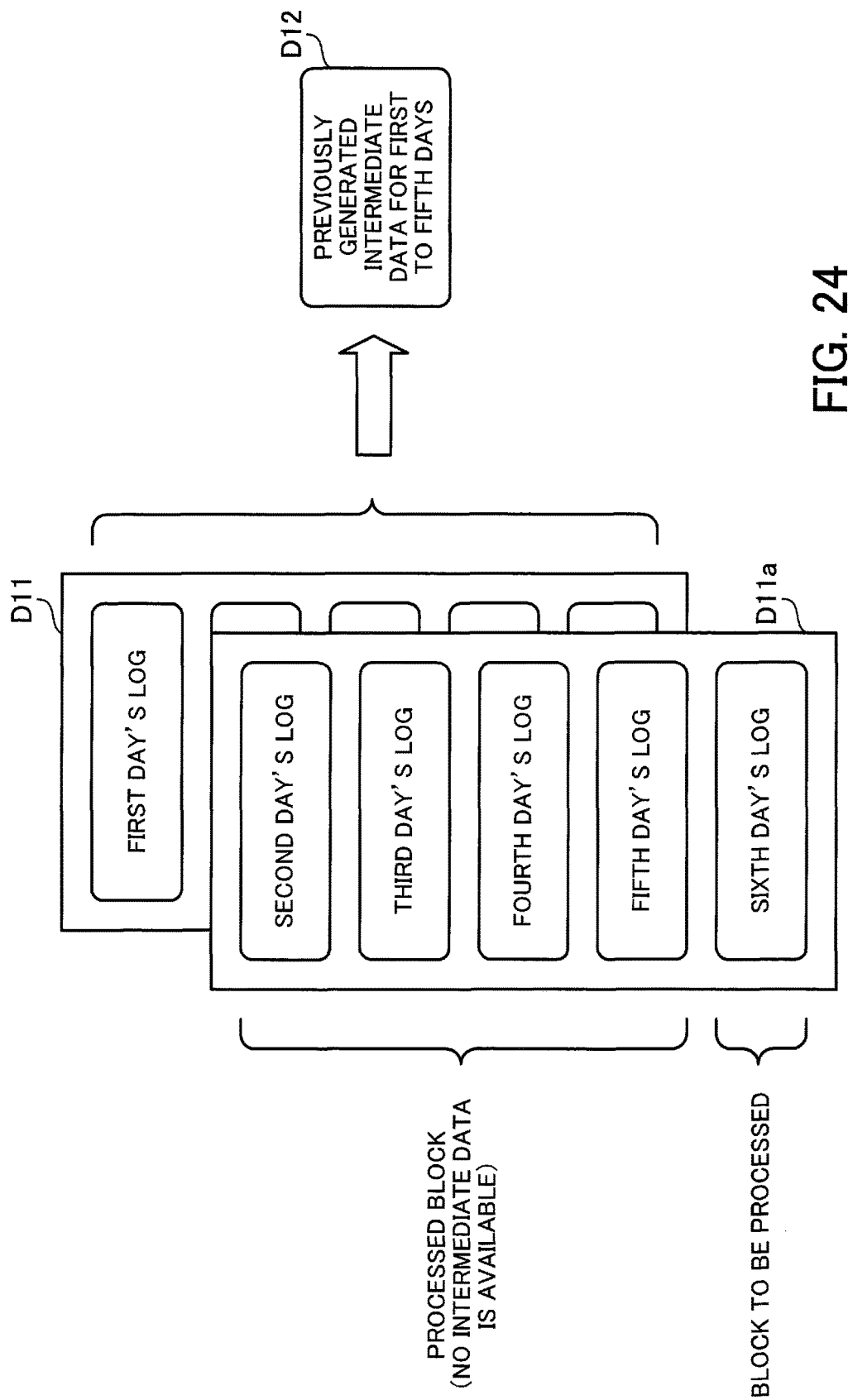
FIG. 24 illustrates an example of input data for a second-round process.

FIG. 24 illustrates an example of input data for a second-round process. The input data in the second-round process is data D11a. The data D11a includes the second to sixth days' logs. At this time point, the intermediate data (data D12) on the first to fifth days' logs is registered in the intermediate data table 711. The log of each day in the data D11a is treated as follows in the processes of FIGS. 18 and 19.

(1) The second to fifth days' logs are processed data, which has already been processed. This is because the data D12 is already obtained by processing the data D11 including the first to fifth days' logs. In addition, the second to fifth days' logs are not data blocks for which intermediate data is available. This is because a set of the dates (first to fifth days) indicated in the data D12, which is intermediate data, is not a subset of the set of dates indicated by the second to fifth days.

(2) The sixth day's log is newly added data, which needs to be subjected to calculation. This is because intermediate data including a result of processing the sixth day's log has not been obtained.

Figure 25:
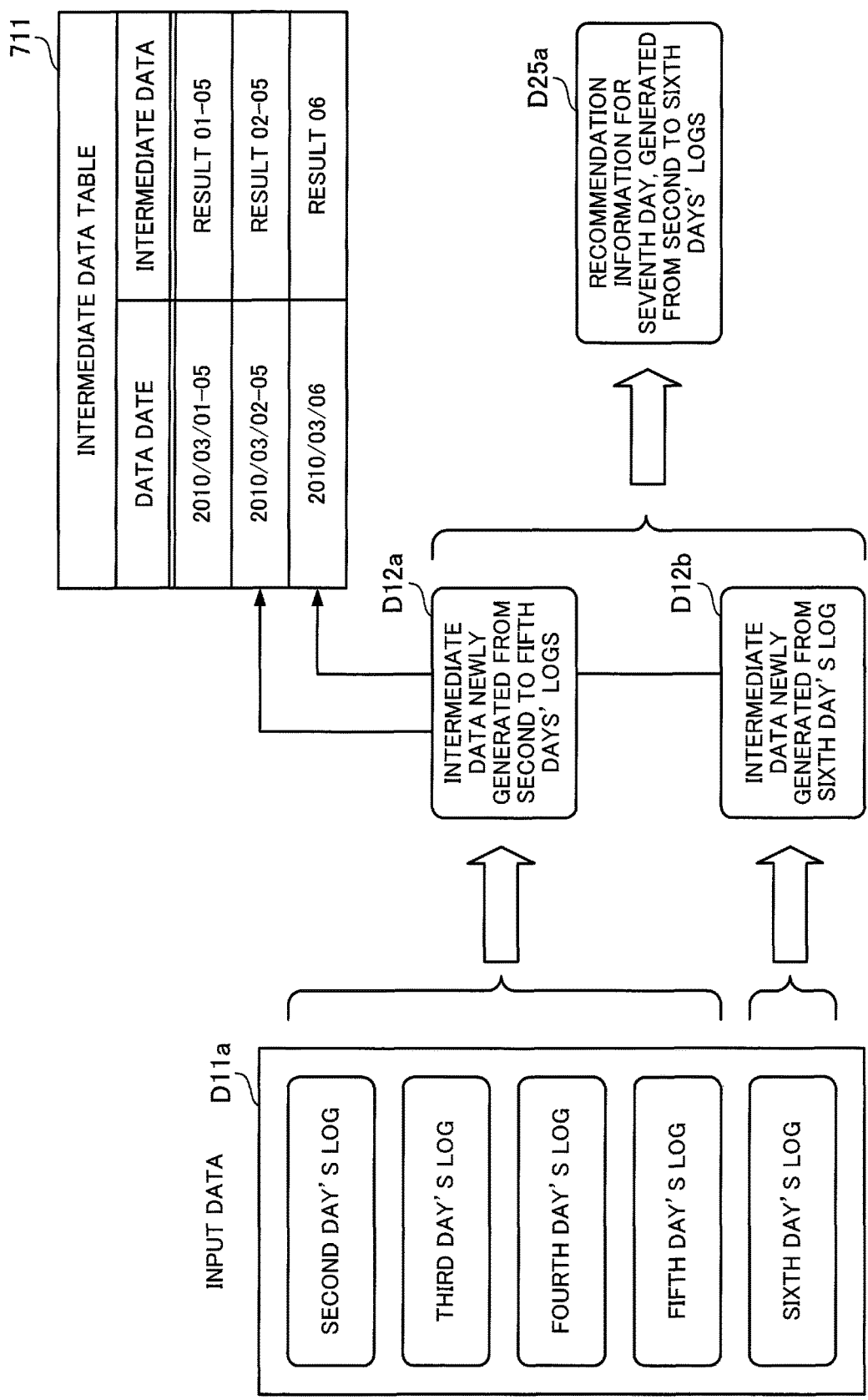
FIG. 25 illustrates an example of the second-round process.

FIG. 25 illustrates an example of the second-round process. The data D11a input in the first Map operation is processed as follows.

(1) Data D12a that is intermediate data is generated from the second to fifth days' logs. The registration server 500 collects the results of performing the first Map operation on the second to fifth days' logs by the data processing servers 900, 900a, . . . , generates the data D12a, and registers the data D12a together with the range of the dates indicated in the data D12a in the intermediate data table 711.

(2) Data D12b that is intermediate data is generated from the sixth day's log. The registration server 500 collects the results of performing the first Map operation on the sixth day's log by the data processing servers 900, 900a, . . . , generates the data D12b, and registers the data D12b together with the range of the dates indicated in the data D12b in the intermediate data table 711.

After that, the first shuffle and sort operation, the first Reduce operation, the second Map operation, . . . are sequentially performed to thereby generate data D25a. The data D25a is recommendation information for the seventh day, generated from the second to sixth days' logs.

Figure 26:
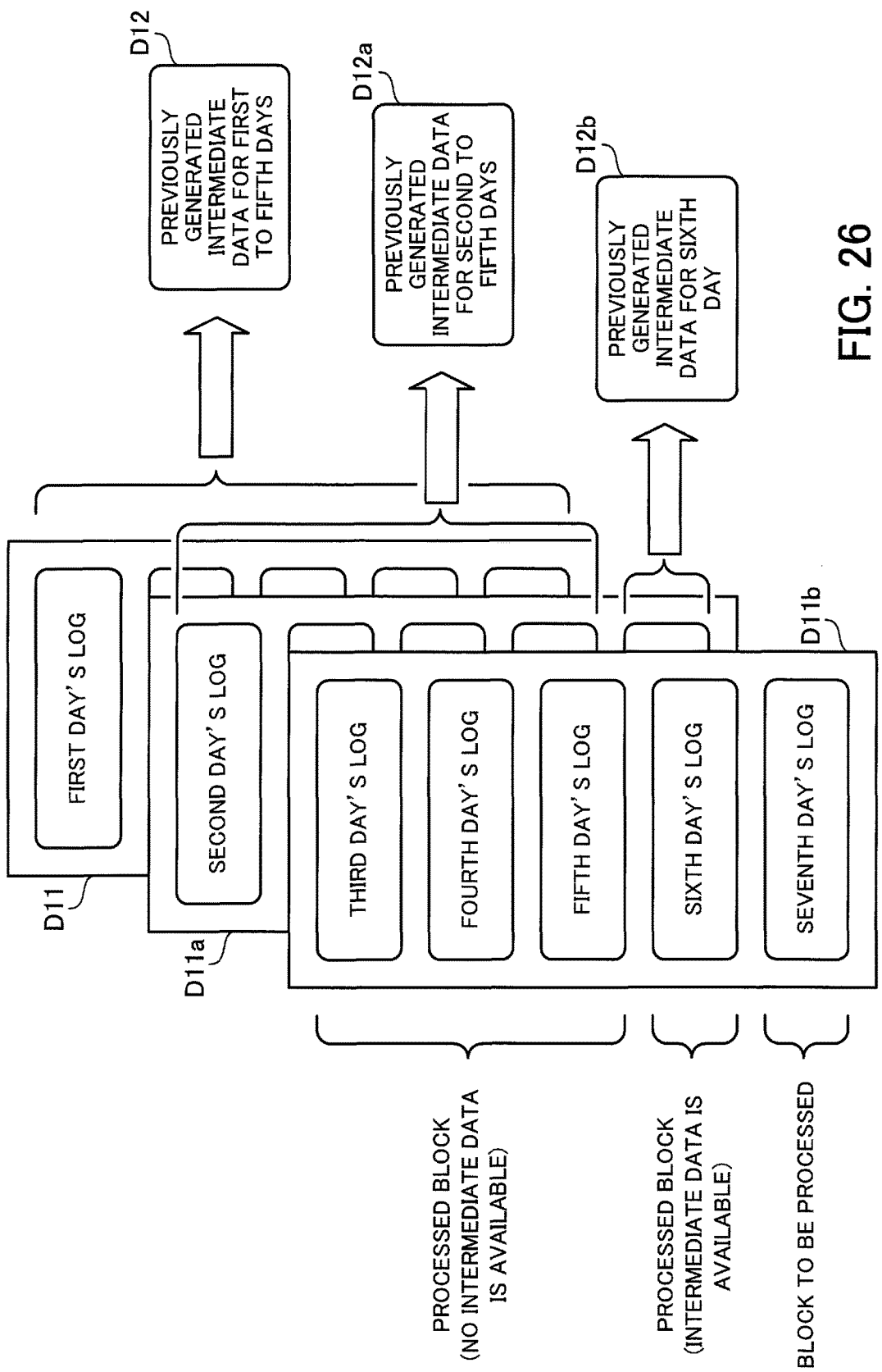
FIG. 26 illustrates an example of input data for a third-round process.

FIG. 26 illustrates an example of input data for a third-round process. The input data in the third-round process is data D11b. The data D11b includes the third to seventh days' logs. At this time point, the intermediate data (data D12) regarding the first to fifth days' logs, the intermediate data (data D12a) regarding the second to fifth days' logs, and the intermediate data (D12b) regarding the sixth day's log are registered in the intermediate data table 711. The log of each day in the data D11b is treated as follows in the processes of FIGS. 18 and 19.

(1) The third to fifth days' logs are processed data, which has already been processed. This is because the data D12 is already obtained by processing the data D11 including the first to fifth days' logs. Or this is because the data D12a is already obtained by processing the data D11a including the second to fifth days' logs. However, the third to fifth days' logs are not data blocks for which intermediate data is available. This is because the sets of the dates (first to fifth days) indicated in the data D12 and D12a, which is intermediate data, and a union of the dates indicated in the data D12, D12a, and D12b are not a subset of the set of the dates indicated by the third to sixth days.

(2) The sixth day's log is processed data, which has already been processed. This is because the data D12b is already obtained by processing the data D11a including the sixth day's log. In addition, the sixth day's log is a data block for which intermediate data is available. This is because a set of the dates (sixth day) indicated in the data D12b, which is intermediate data, is a subset of the set of the dates indicated by the third to sixth days.

(3) The seventh day's log is newly added data, which needs to be subjected to calculation. This is because none of the data D12, D12a, and D12b includes a result of processing the seventh day's log.

Figure 27:
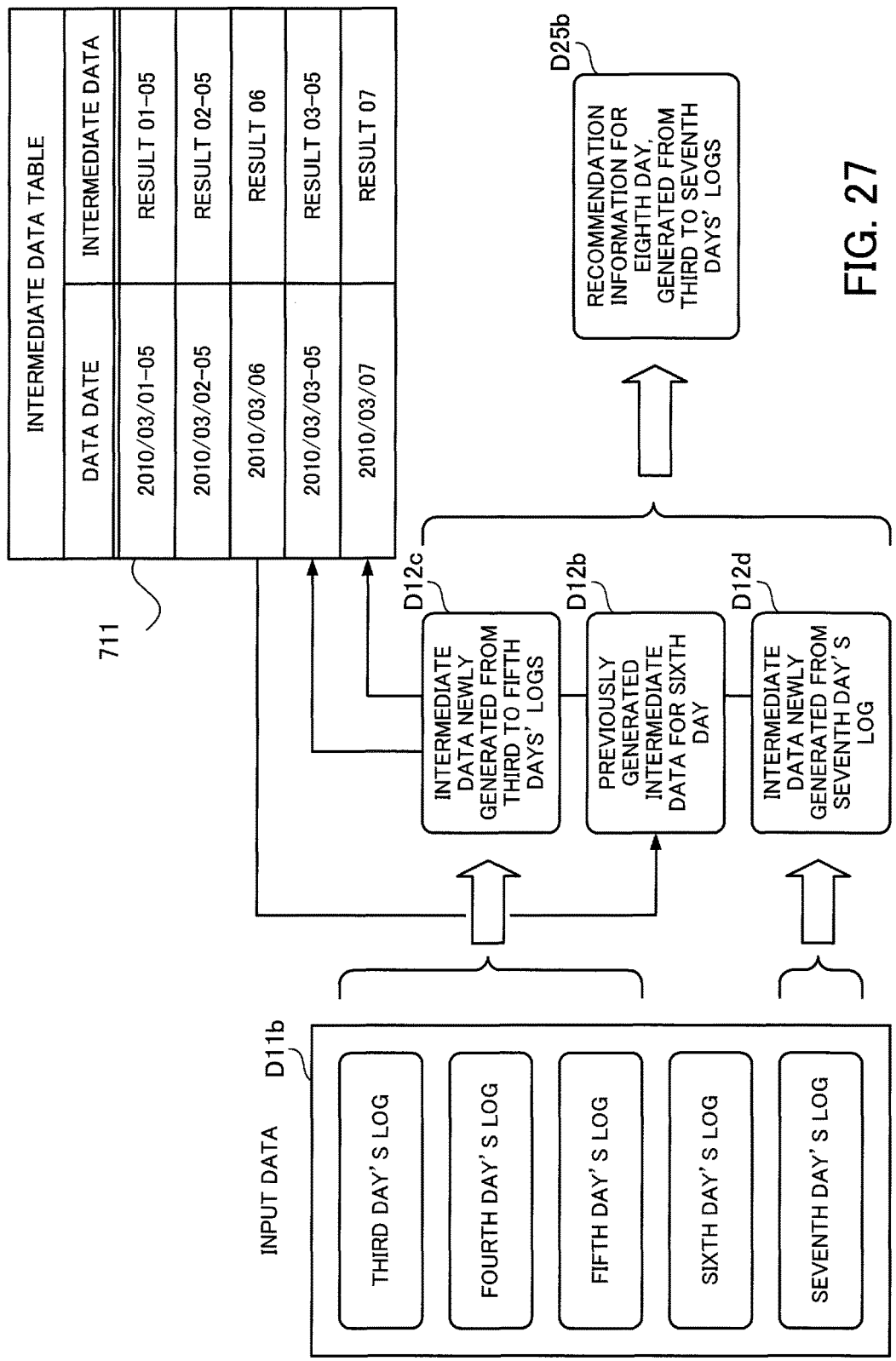
FIG. 27 illustrates an example of the third-round process.

FIG. 27 illustrates an example of the third-round process. The data D11b input in the first Map operation is processed as follows.

(1) Data D12c that is intermediate data is generated from the third to fifth days' logs. The registration server 500 collects the results of performing the first Map operation on the third to fifth days' logs by the data processing servers 900, 900a, . . . , generates the data D12c, and registers the data D12c together with the range of the dates indicated in the data D12c in the intermediate data table 711.

(2) With respect to the sixth day's log, the data D12b, which is existing available intermediate data, is obtained from the intermediate data table 711.

(3) Data D12d that is intermediate data is generated from the seventh day's log. The registration server 500 collects the results of performing the first Map operation on the seventh day's log by the data processing servers 900, 900a, . . . , generates the data D12d, and registers the data D12d together with the range of the dates indicated in the data D12d in the intermediate data table 711.

After that, the first shuffle and sort operation, the first Reduce operation, the second Map operation, . . . are sequentially performed to thereby generate data D25b. The data D25b is recommendation information for the eighth day, generated from the third to seventh days' logs.

As described above, in the distributed processing system of the second embodiment, data blocks for which previously generated intermediate data is available is identified from input data. Then, the previous intermediate data is obtained for the data blocks of the input data, and the other data blocks are subjected to the distributed processing.

This approach makes it possible to streamline the data processing. More specifically, the data processing servers 900, 900a, . . . , are caused to process data blocks other than data blocks for which previously generated intermediate data is available, in a distributed manner. This eliminates the need of processing the entire input data. Skipping the same processing as previously performed improves processing efficiency and achieves higher-speed processing. In addition, it is possible to reduce the amount of data that is processed by the data processing servers 900, 900a, . . . , so as to reduce the workloads of the data processing servers 900, 900a, . . . .

In this connection, as an example, the distributed processing system of the second embodiment manages intermediate data by a range of dates of input data. Alternatively, the intermediate data may be managed by another data item. For example, each day is used to manage all of intermediate data. In this case, for example, the processing result registration unit 510 groups intermediate data by the day, and registers the intermediate data in the intermediate data table 711 stored in the intermediate data storage unit 710. This improves the reusability of the intermediate data.

Further, the distributed processing system of the second embodiment determines based on the registration dates of rating values whether input data has been processed or not and whether there is available intermediate data or not. Alternatively, another data item may be used for the determination. For example, the determination may be made based on year, month, week, time zone, or the like.

Still further, as an example, the distributed processing system of the second embodiment classifies input data by, but not limited to, date (time). For example, the above method is applicable for the case where input data is classified by place (coordinate values or the like). More specifically, for input data on locations within a certain area, it is determined for the data on each location in a partial area of the area whether previous calculation results are available or not, in the same way as described in the second embodiment, to thereby control the subsequent processing efficiently.

Still further, the distributed processing system of the second embodiment distributes processing to a plurality of server apparatuses. Alternatively, at least some of the functions of the plurality of server apparatuses may be integrated in a single server apparatus. For example, the functions of the execution control server 100, process analysis server 200, process transformation server 300, and data analysis server 400 may be implemented by using a single server apparatus.

According to one aspect, it is possible to streamline data processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data processing method executed in a system including an information processing apparatus connected to a network, a memory device connected to the network, and a plurality of nodes connected to the network, where first data processing is performed using the plurality of nodes in parallel and second data processing is performed on a result of the first data processing, the data processing method comprising:

splitting, by a processor included in the information processing apparatus, a data set including a plurality of segments into a first segment and a plurality of second segments with reference to previous results of the first data processing previously performed, which are stored in the memory device, the first segment being a segment for which one or more of the previous results stored in the memory device are usable as a result of performing the first data processing on the first segment, the plurality of second segments being segments for which the previous results stored in the memory device are not usable, wherein the data set includes elements of a prescribed parameter as a first set, the previous results are respectively associated with second sets of elements of the prescribed parameter included in corresponding data sets used for obtaining the previous results, and the one or more of the previous results that are usable for the first segment are respectively corresponding to one or more second sets associated with different elements that are a maximum number of elements all included in the first set;

assigning, by the processor, the plurality of second segments to the plurality of nodes, and performing, by using the plurality of nodes in parallel, the first data processing on the plurality of second segments; and performing, by the processor, the second data processing on the one or more of the previous results corresponding to the first segment, which are stored in the memory device, and results obtained from the plurality of second segments using the plurality of nodes;

wherein the splitting includes splitting the data set in such a way that a first block of the data set which has not previously been subjected to the first data processing and a second block of the data set which has previously been subjected to the first data processing but for which usable previous results are not stored in the memory device belong to different second segments; and wherein the using the plurality of nodes in parallel to perform the first data processing includes storing a result of performing the first data processing on the first block and a result of performing the first data processing on the second block separately in the memory.

2. The data processing method according to claim 1, wherein the processor determines that a result generated by performing the first data processing previously on a part of the data set and other data set, which is stored in the memory, will not be used for processing the data set.

3. The data processing method according to claim 1, wherein the second data processing includes a process of aggregating a result of performing the first data processing on the first segment and results of performing the first data processing on the plurality of second segments.

4. A distributed processing system where first data processing is performed using a plurality of nodes connected to a network in parallel and second data processing is performed on a result of the first data processing, the distributed processing system comprising:

an information processing apparatus connected to the network, the information processing apparatus including:

a memory connected to the network and configured to store previous results of the first data processing previously performed; and a processor configured to perform a process including:

splitting, with reference to the memory, a data set including a plurality of segments into a first segment and a plurality of second segments, the first segment being a segment for which one or more of the previous results stored in the memory are usable as a result of performing the first data processing on the first segment, the plurality of second segments being segments for which the previous results stored in the memory are not usable, wherein the data set includes elements of a prescribed parameter as a first set, the previous results are respectively associated with second sets of elements of the prescribed parameter included in corresponding data sets used for obtaining the previous results, and the one or more of the previous results that are usable for the first segment are respectively corresponding to one or more second sets associated with different elements that are a maximum number of elements all included in the first set; and assigning the plurality of second segments to the plurality of nodes, performing, by using the plurality of nodes in parallel, the first data processing on the plurality of second segments, and exercising control so as to perform the second data processing on the previous result corresponding to the first segment, which is stored in the memory, and results obtained from the plurality of second segments using the plurality of nodes;

wherein the splitting includes splitting the data set in such a way that a first block of the data set which has not previously been subjected to the first data processing and a second block of the data set which has previously been subjected to the first data processing but for which usable previous results are not stored in the memory belong to different second segments; and wherein the using the plurality of nodes in parallel to perform the first data processing includes storing a result of performing the first data processing on the first block and a result of performing the first data processing on the second block separately in the memory.

5. A non-transitory computer-readable medium storing a computer program for controlling a system including a computer connected to a network, a memory device connected to the network, and a plurality of nodes connected to the network, where first data processing is performed using the plurality of nodes in parallel and second data processing is performed on a result of the first data processing, the computer program causing the computer to perform a process comprising:

splitting a data set including a plurality of segments into a first segment and a plurality of second segments with reference to previous results of the first data processing previously performed, which are stored in the memory device, the first segment being a segment for which one or more of the previous results stored in the memory device are usable as a result of performing the first data processing on the first segment, the plurality of second segments being segments for which the previous results stored in the memory device are not usable, wherein the data set includes elements of a prescribed parameter as a first set, the previous results are respectively associated with second sets of elements of the prescribed parameter included in corresponding data sets used for obtaining the previous results, and the one or more of the previous results that are usable for the first segment are respectively corresponding to one or more second sets associated with different elements that are a maximum number of elements all included in the first set;

assigning the plurality of second segments to the plurality of nodes, and performing, by using the plurality of nodes in parallel, the first data processing on the plurality of second segments; and exercising control so as to perform the second data processing on the one or more of the previous results corresponding to the first segment, which are stored in the memory device, and results obtained from the plurality of second segments using the plurality of nodes;

wherein the splitting includes splitting the data set in such a way that a first block of the data set which has not previously been subjected to the first data processing and a second block of the data set which has previously been subjected to the first data processing but for which usable previous results are not stored in the memory belong to different second segments; and wherein the using the plurality of nodes in parallel to perform the first data processing includes storing a result of performing the first data processing on the first block and a result of performing the first data processing on the second block separately in the memory.

* * * * *